(12) United States Patent
Tamaizumi et al.

(10) Patent No.: US 7,826,950 B2
(45) Date of Patent: Nov. 2, 2010

(54) ELECTRIC POWER STEERING APPARATUS

(75) Inventors: Terutaka Tamaizumi, Okazaki (JP); Shinya Aono, Okazaki (JP)

(73) Assignee: JTEKT Corporation, Osaka (JP)

( * ) Notice: Subject to any disclaimer, the term of this patent is extended or adjusted under 35 U.S.C. 154(b) by 699 days.

(21) Appl. No.: 11/667,327

(22) PCT Filed: Nov. 8, 2005

(86) PCT No.: PCT/JP2005/020461
§ 371 (c)(1),
(2), (4) Date: May 8, 2007

(87) PCT Pub. No.: WO2006/051786
PCT Pub. Date: May 18, 2006

(65) Prior Publication Data
US 2008/0033613 A1   Feb. 7, 2008

(30) Foreign Application Priority Data
Nov. 9, 2004   (JP) .............................. 2004-325395

(51) Int. Cl.
*B62D 5/04*   (2006.01)
(52) U.S. Cl. ........................... 701/42; 701/41; 180/443; 180/446
(58) Field of Classification Search ............... 701/41, 701/42, 43; 180/443, 446
See application file for complete search history.

(56) References Cited

U.S. PATENT DOCUMENTS

| | | | |
|---|---|---|---|
| 6,092,012 A * | 7/2000 | Shimizu .................... | 701/41 |
| 6,131,693 A * | 10/2000 | Mukai et al. ................. | 180/446 |
| 6,422,335 B1 * | 7/2002 | Miller ......................... | 180/446 |
| 6,594,568 B2 * | 7/2003 | Matsuoka .................... | 701/41 |
| 6,687,589 B2 | 2/2004 | Kanda | |

FOREIGN PATENT DOCUMENTS

| | | |
|---|---|---|
| JP | 01-114574 | 5/1989 |
| JP | 01-119472 | 5/1989 |
| JP | 07-309250 | 11/1995 |
| JP | 8-108857 | 4/1996 |
| JP | 10-203383 | 8/1998 |
| JP | 2002-104222 | 4/2002 |
| JP | 2002-234454 | 8/2002 |
| JP | 2003-26022 | 1/2003 |
| JP | 2003-81102 | 3/2003 |
| JP | 2003-226252 | 8/2003 |
| JP | 2004-098754 | 4/2004 |
| JP | 2004-322741 | 11/2004 |
| WO | WO-01/12492 | 2/2001 |

* cited by examiner

*Primary Examiner*—Thomas G Black
*Assistant Examiner*—Peter D Nolan
(74) *Attorney, Agent, or Firm*—Jordan and Hamburg LLP

(57) ABSTRACT

In an electric power steering apparatus, steering torque of a steering wheel is detected by a torque sensor, and a motor 10 for generating steering assist power is controlled so that the steering assist power is generated according to a basic assist torque corresponding to the detected steering torque. A correspondence relationship between the steering torque and the basic assist torque is set such that an assist gradient that is a rate of change of the basic assist torque to the steering torque varies according to variation of the steering torque. A correction amount of an output of the motor 10 varies according to the variation of the assist gradient.

5 Claims, 27 Drawing Sheets

[Fig. 1]
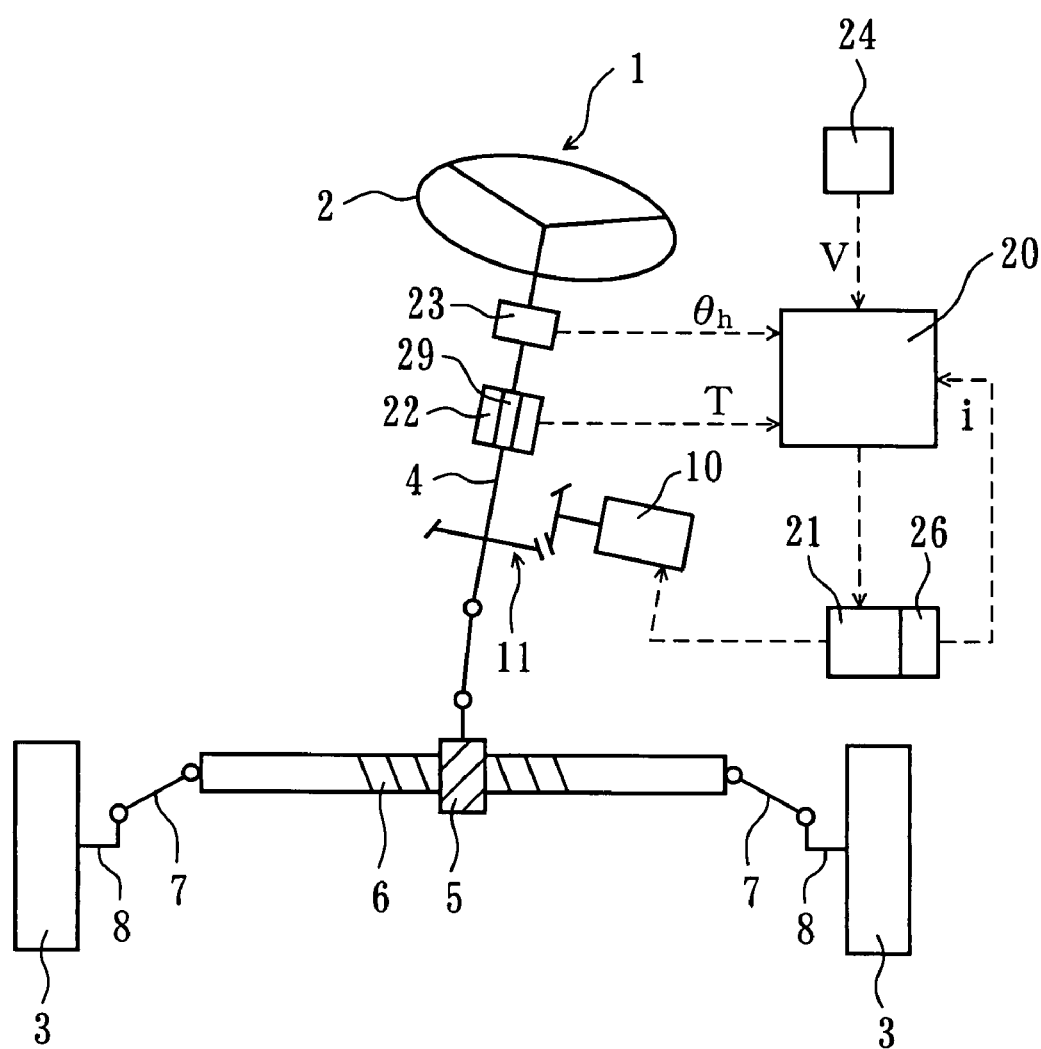

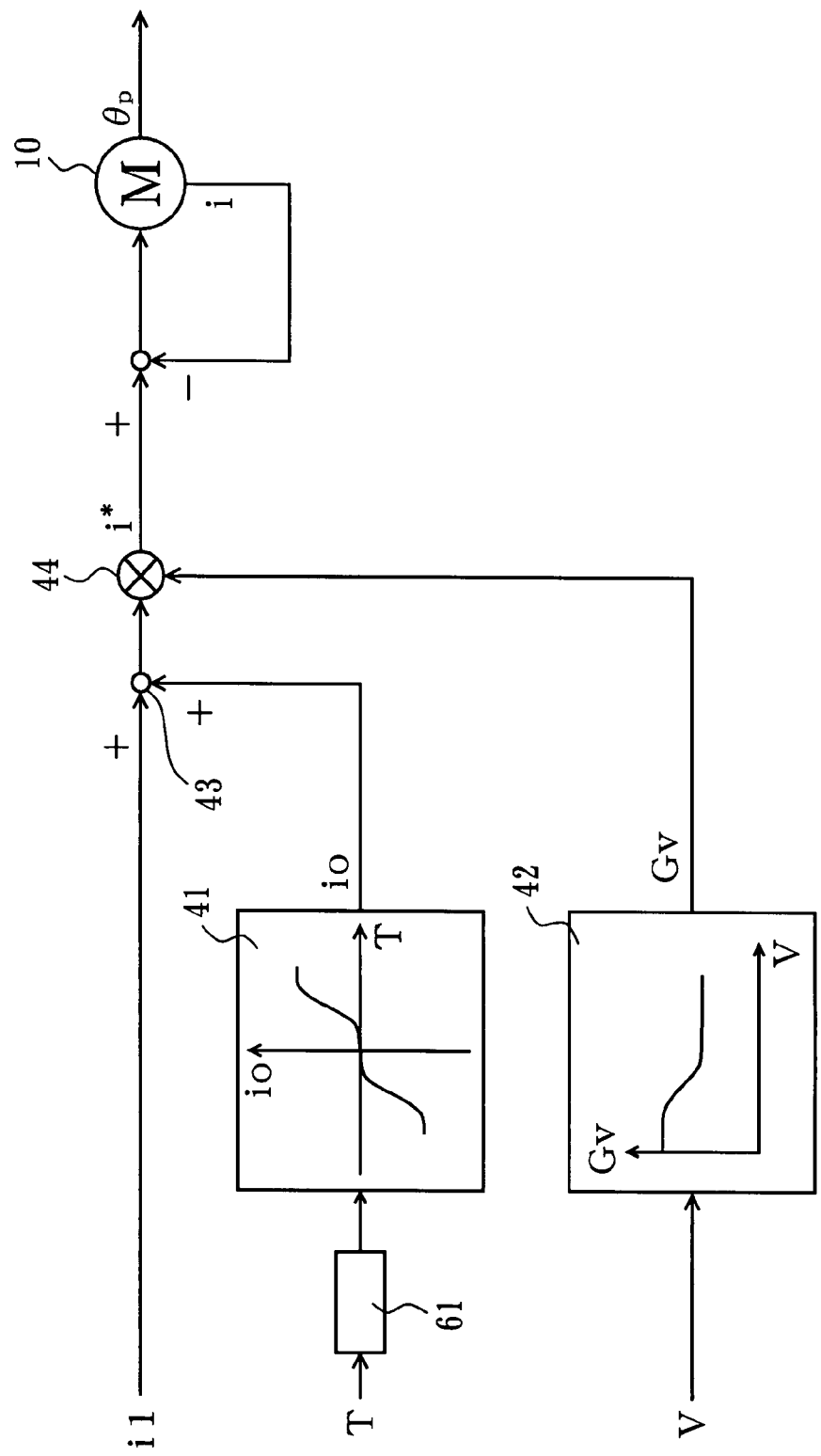
[Fig. 2]

[Fig. 3]
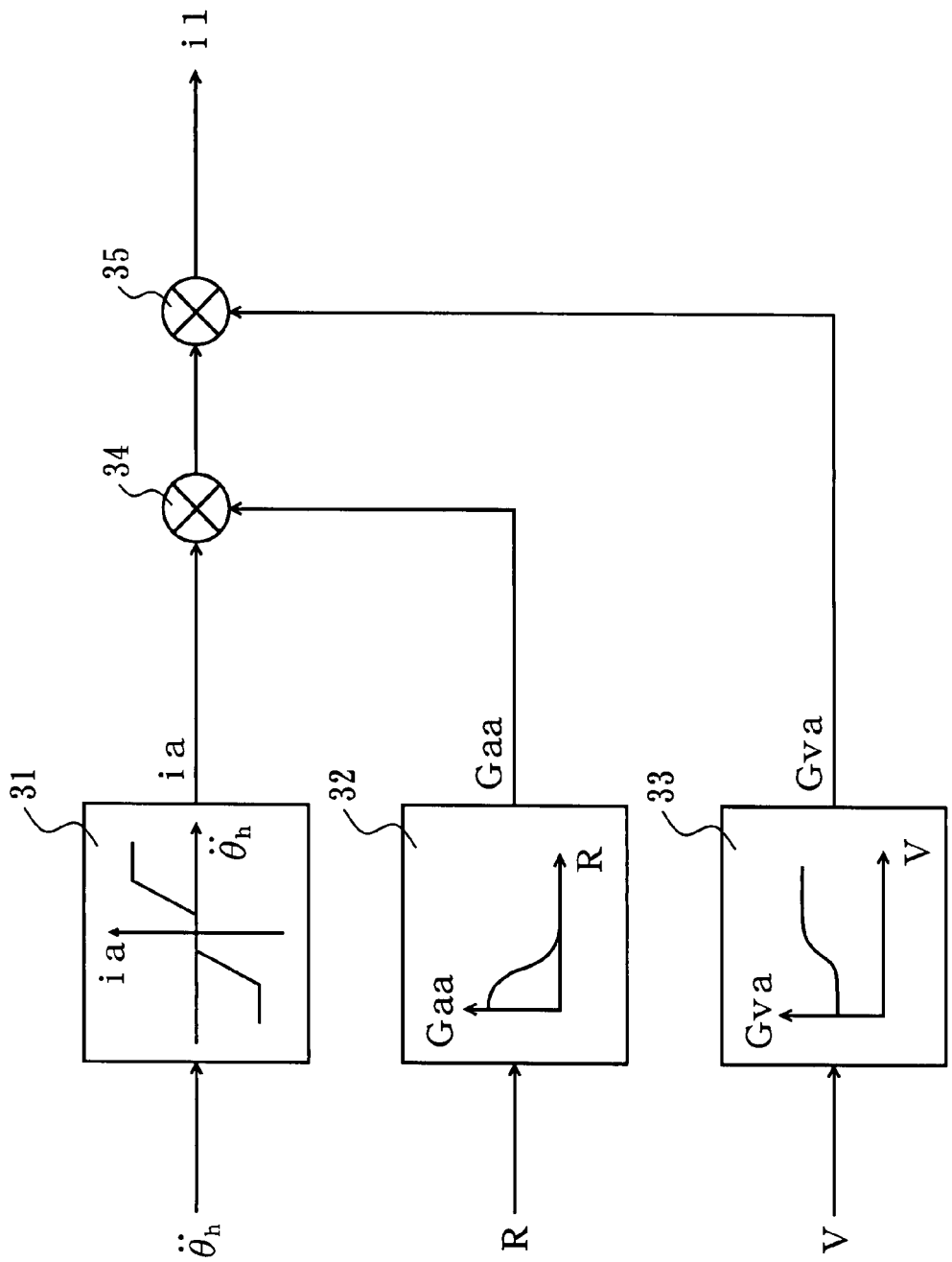

[Fig. 4]
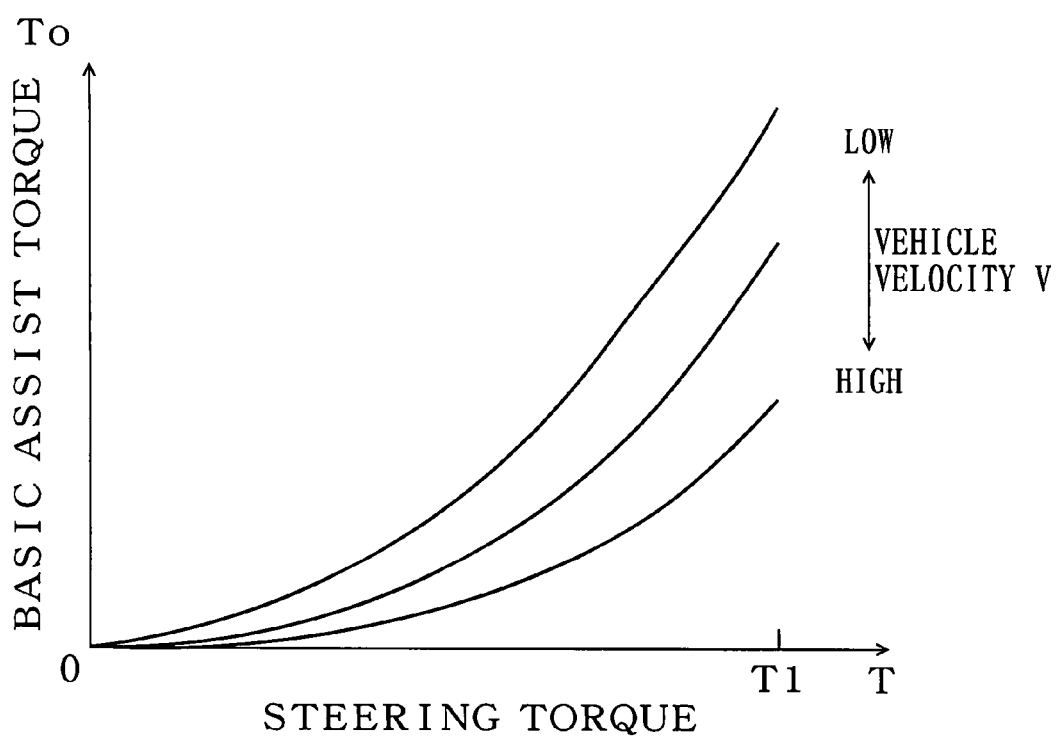

[Fig. 5]
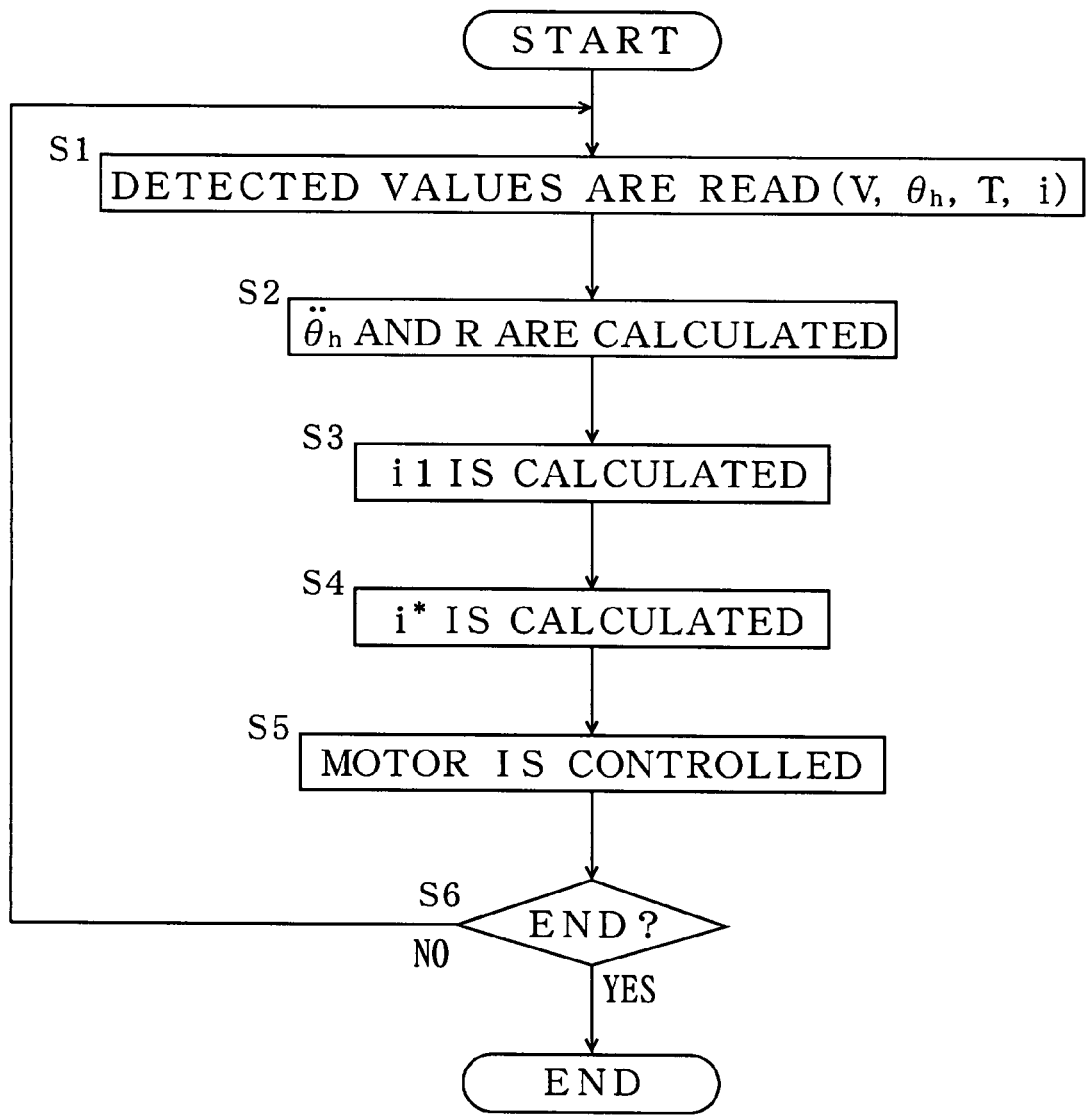

[Fig. 6]
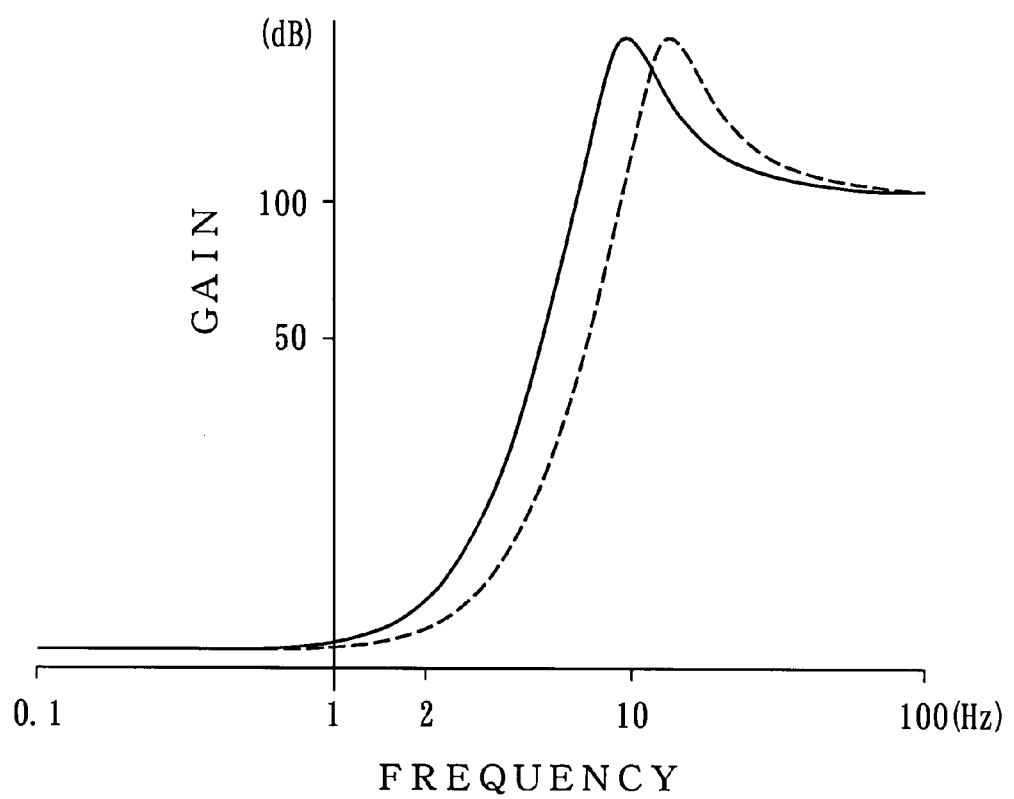

[Fig. 7]
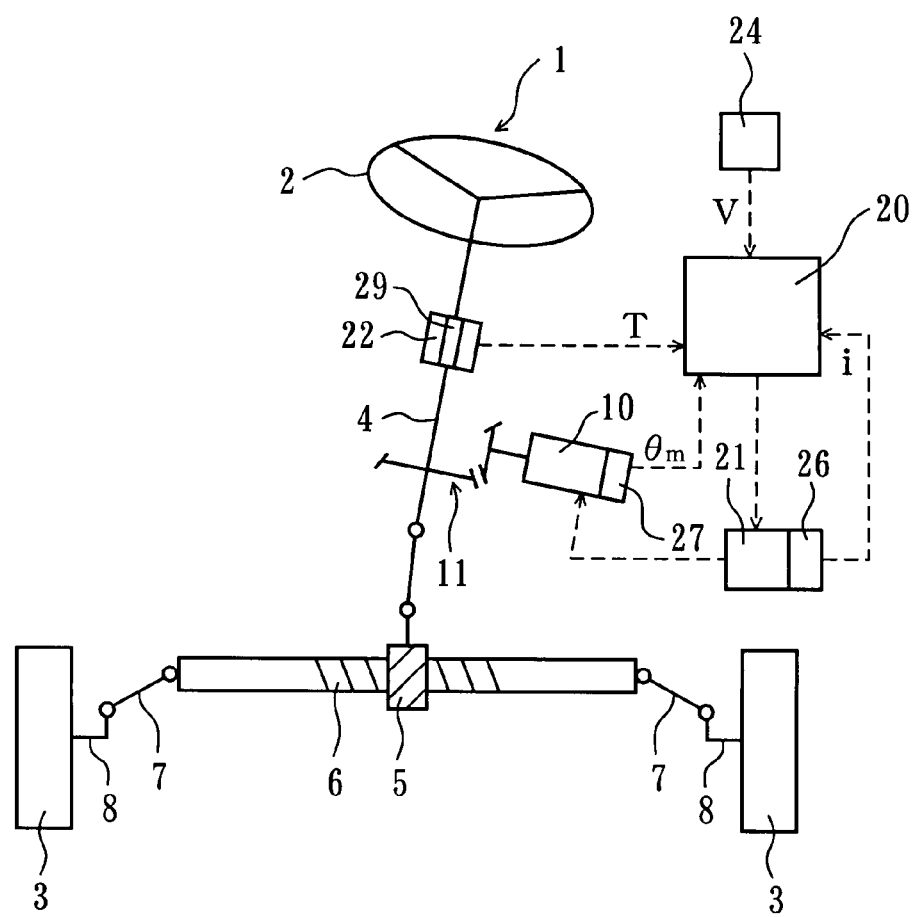

[Fig. 8]
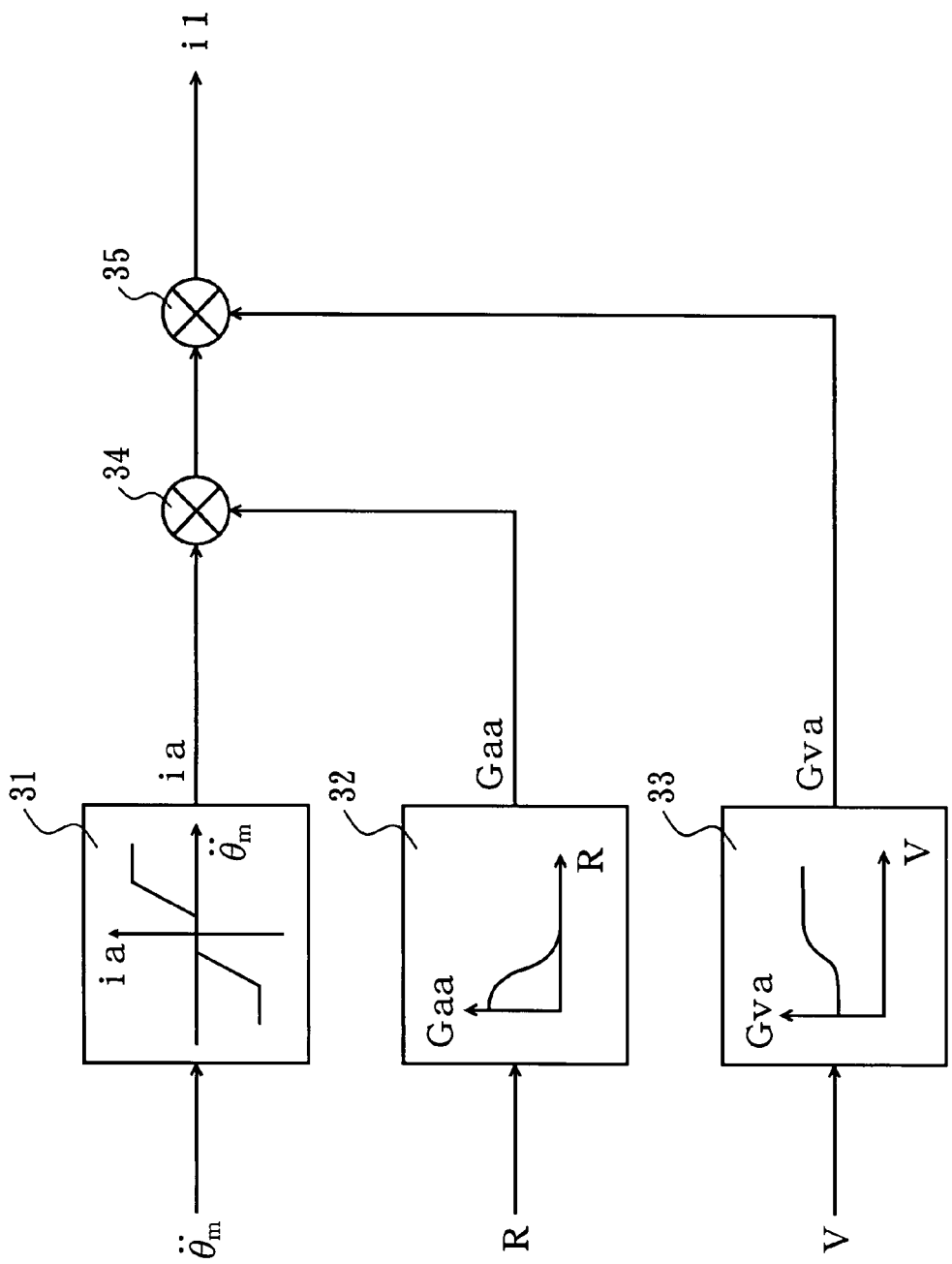

[Fig. 9]
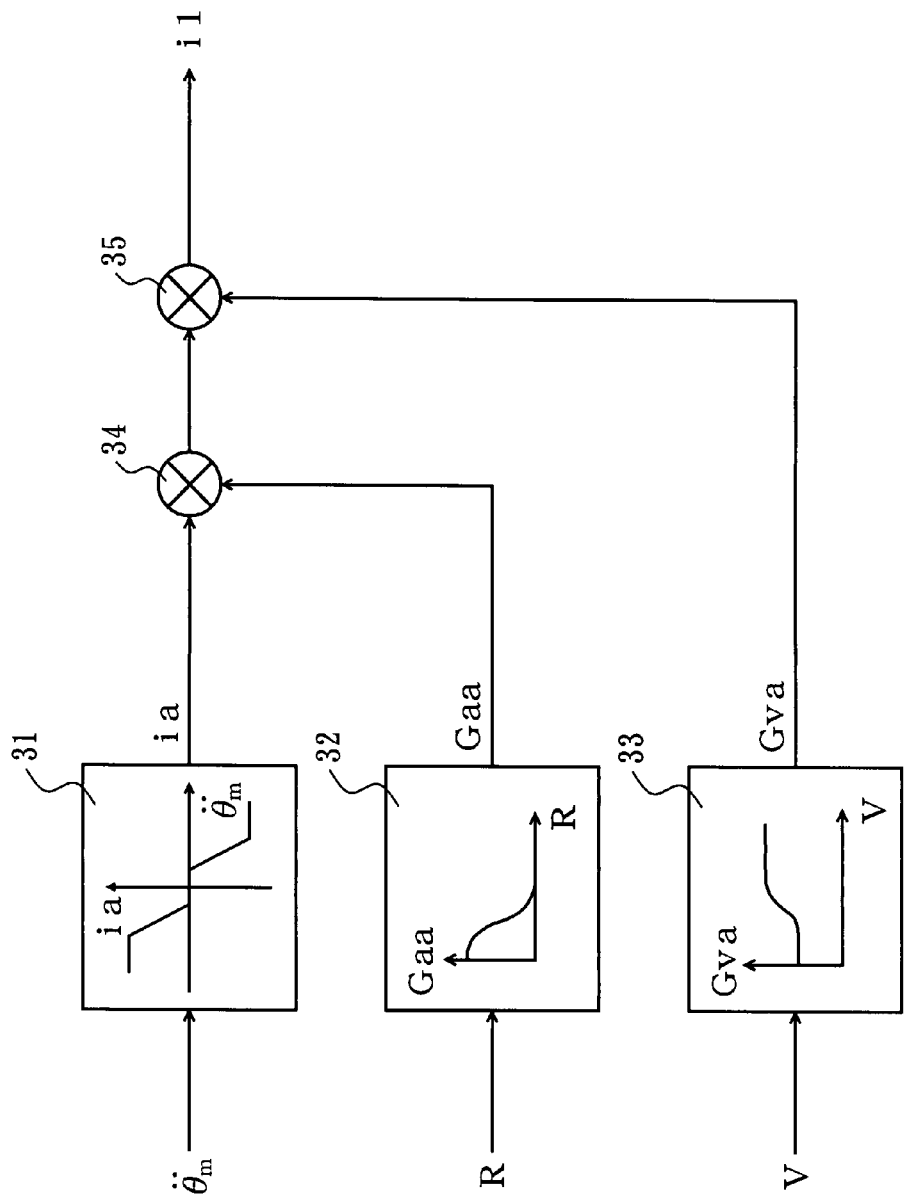

[Fig. 10]
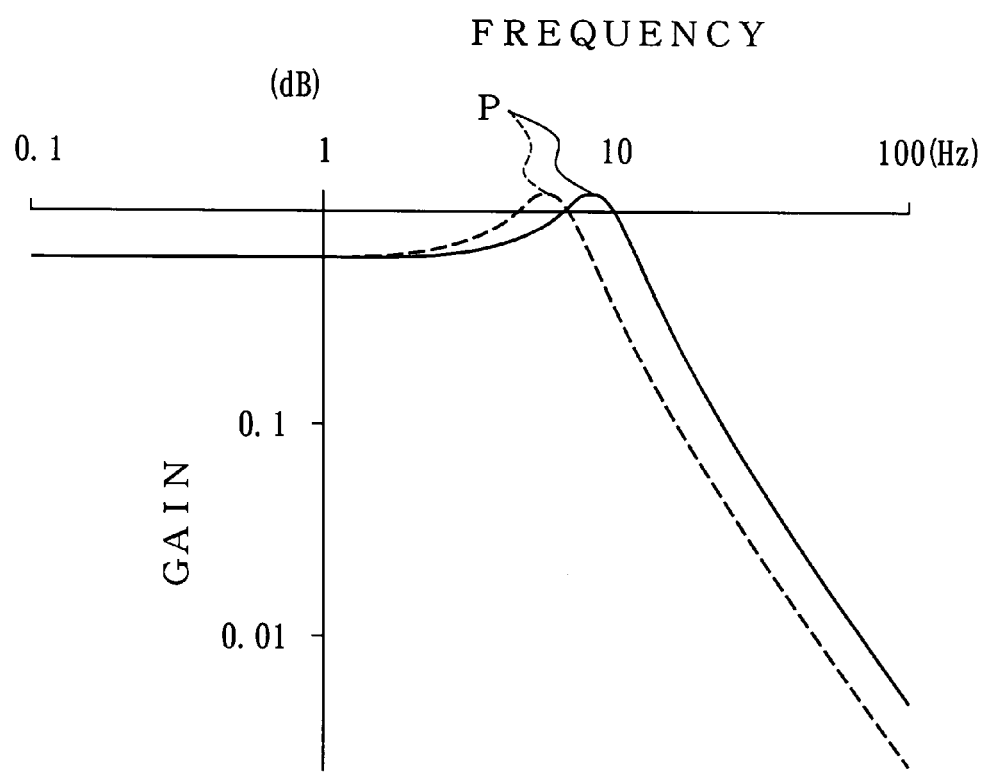

[Fig. 11]
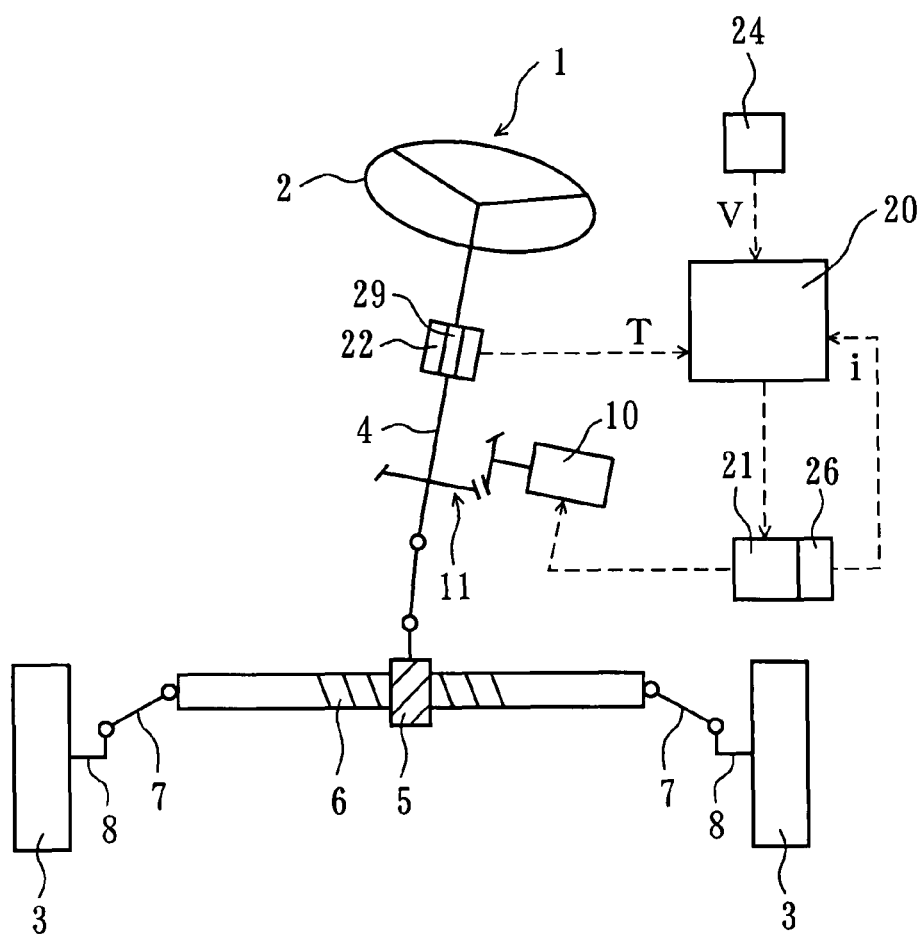

[Fig. 12]
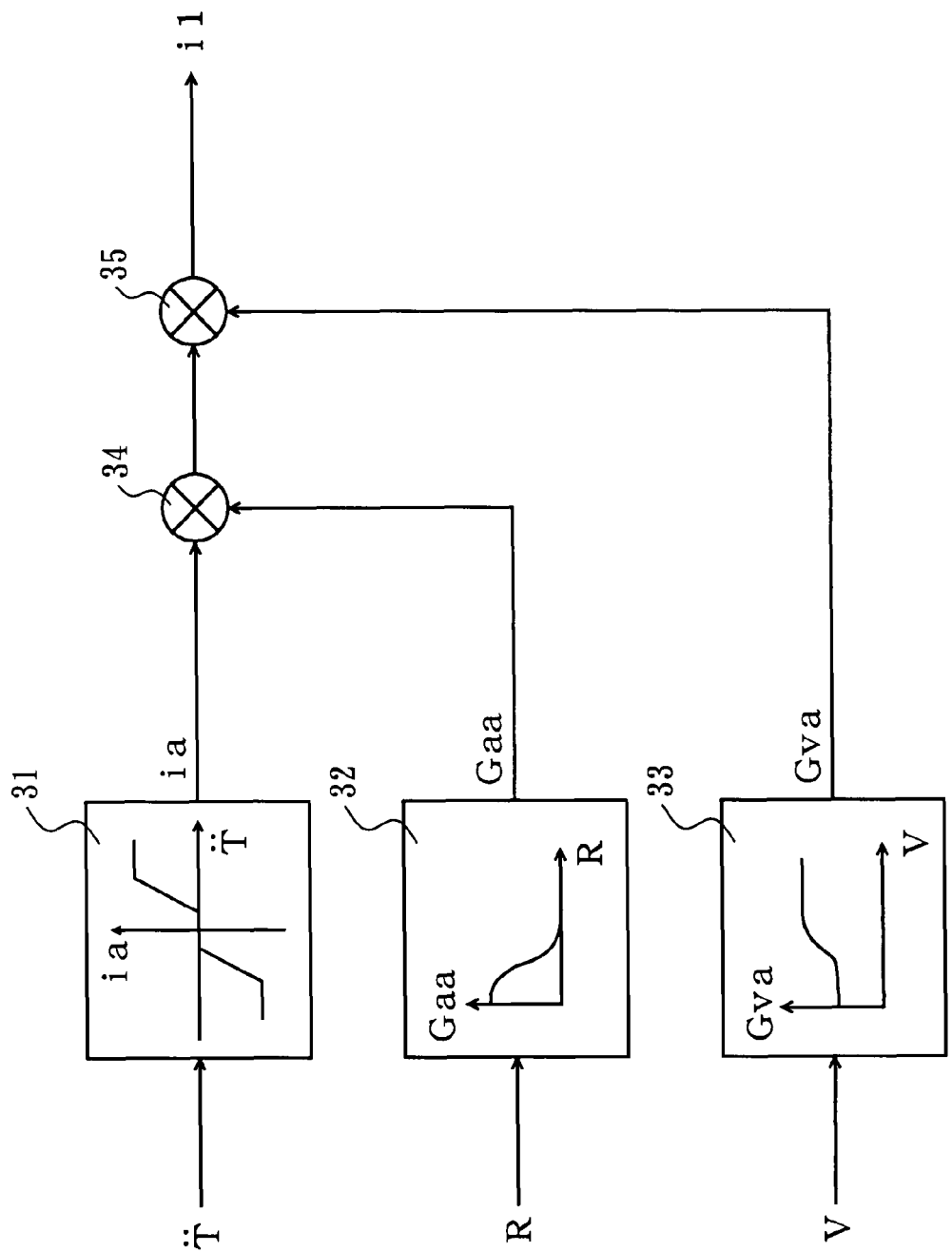

[Fig. 13]
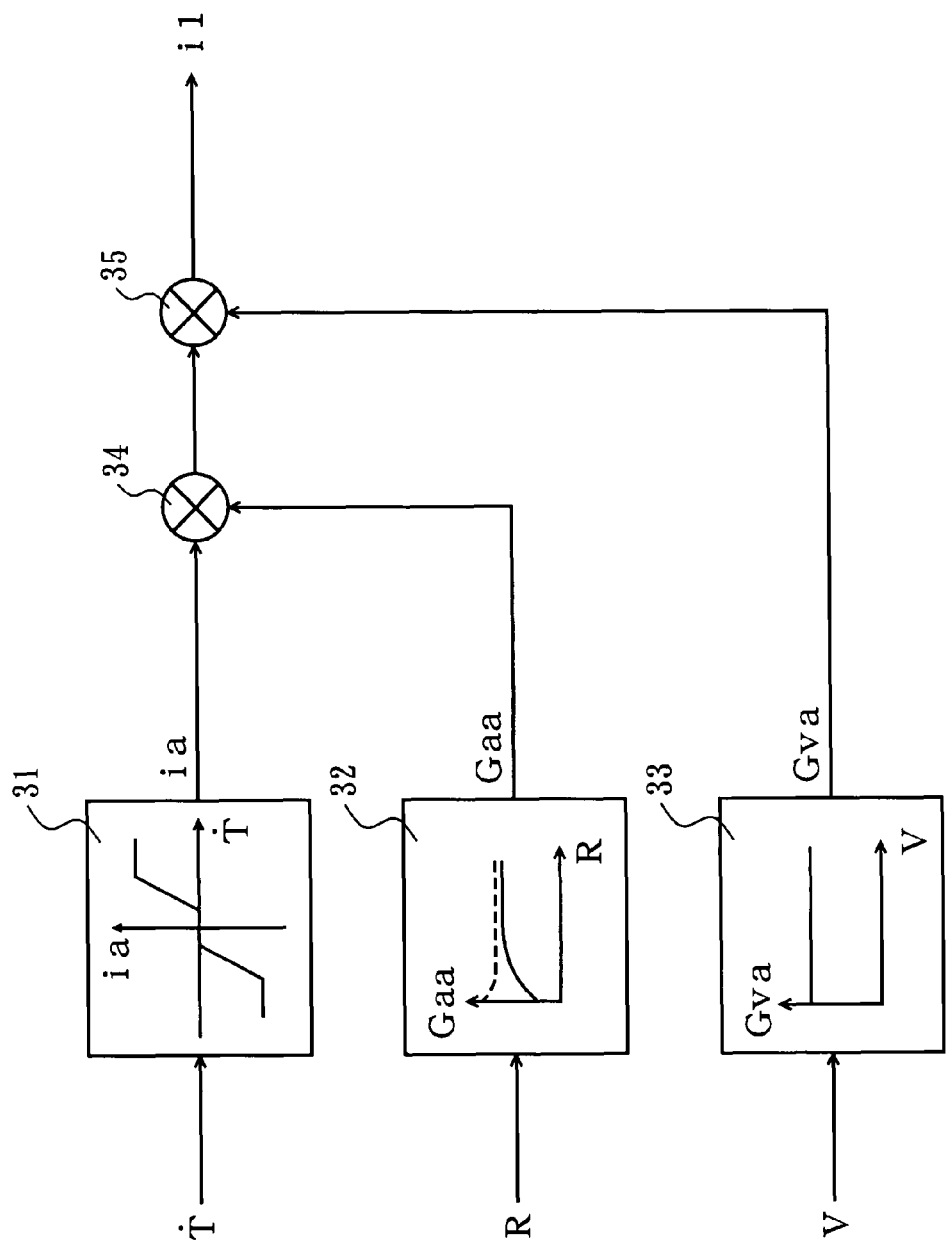

[Fig. 14]
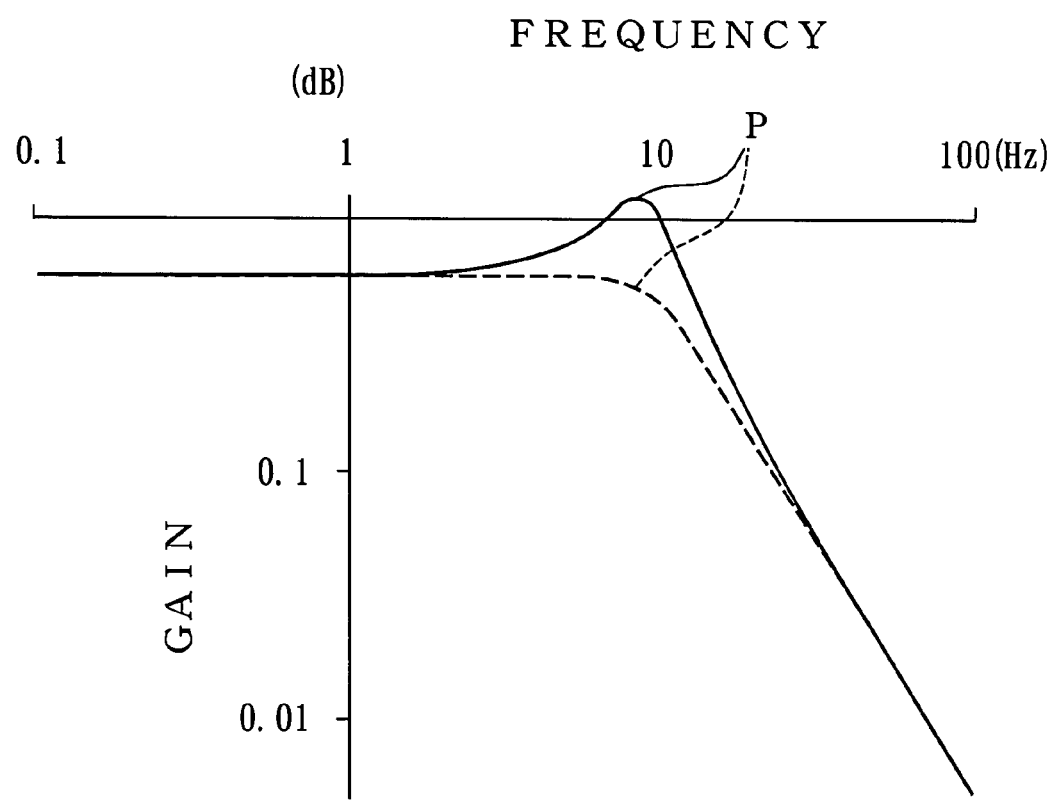

[Fig. 15]
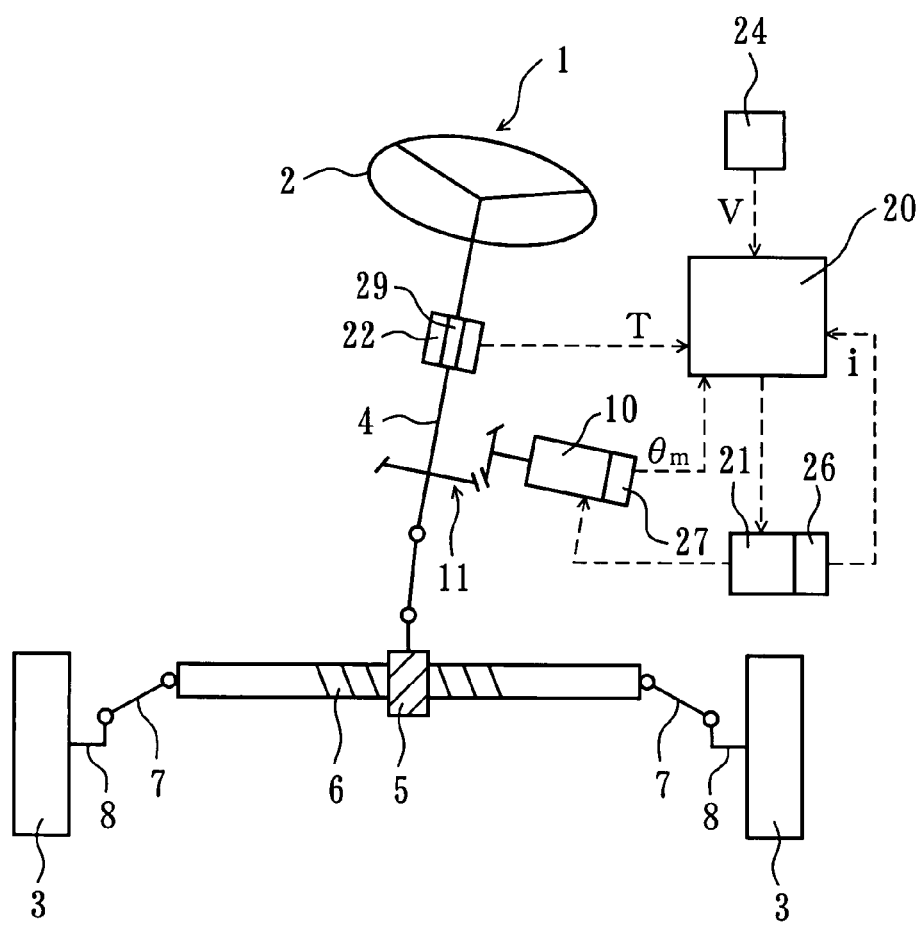

[Fig. 16]
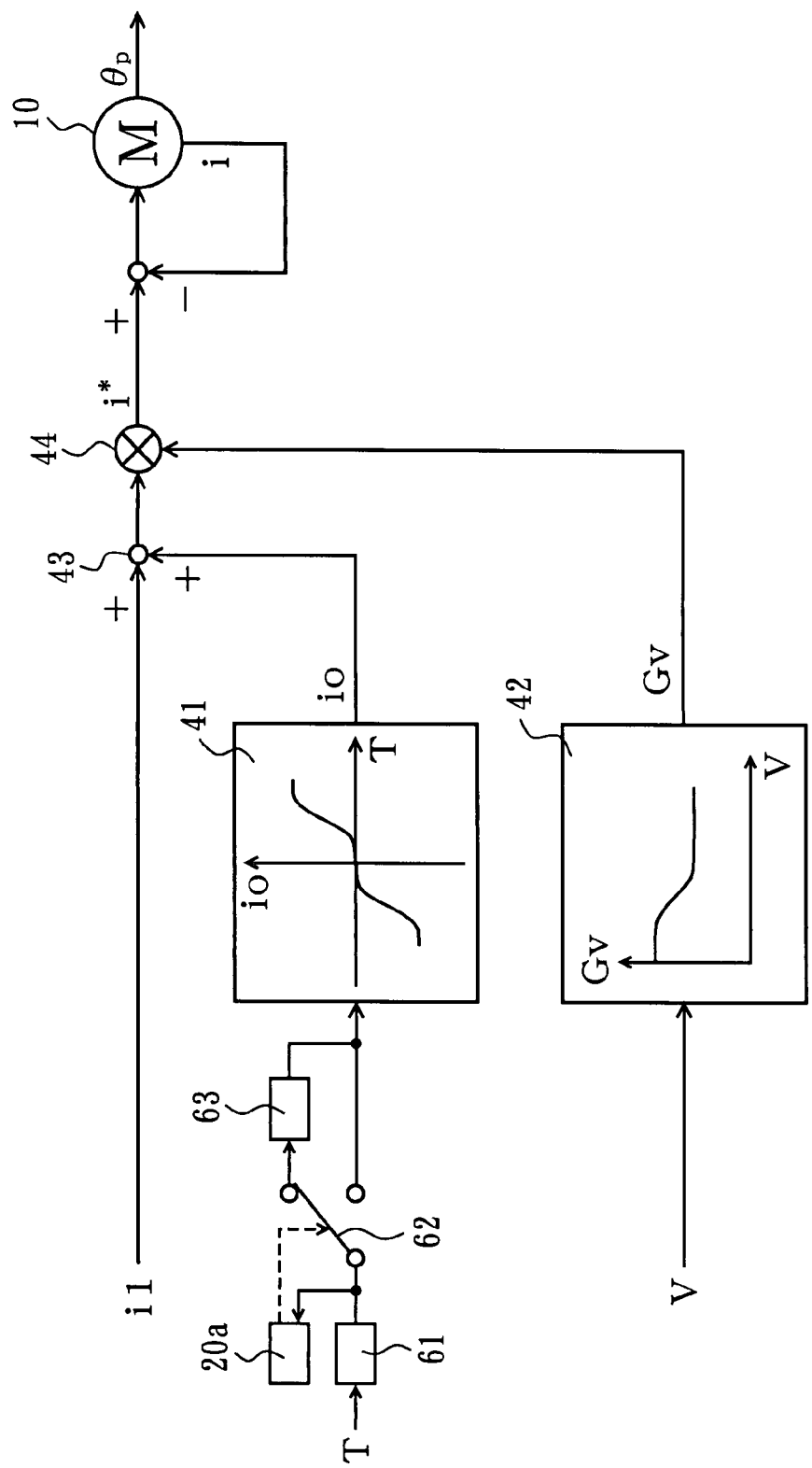

[Fig. 17]
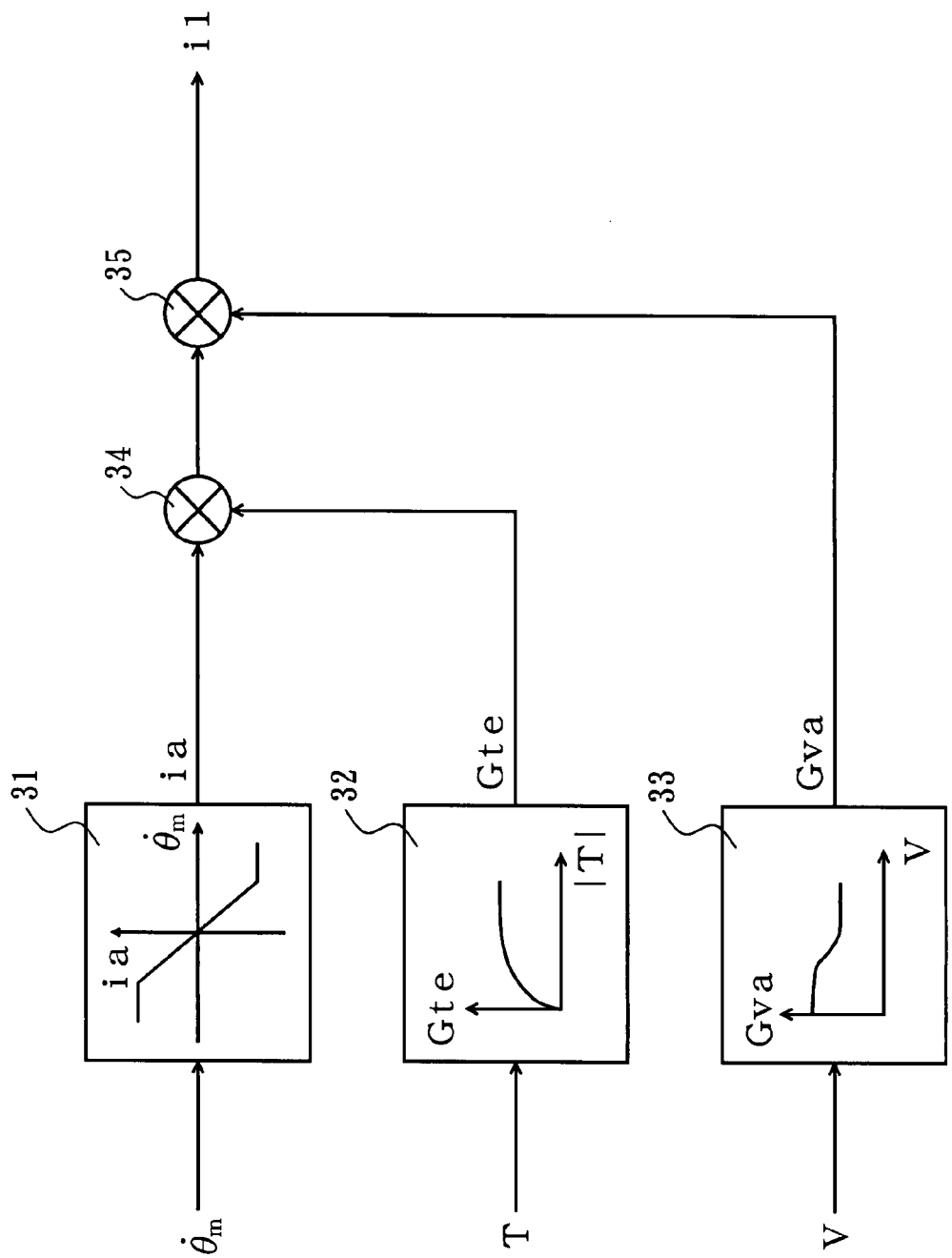

[Fig. 18]
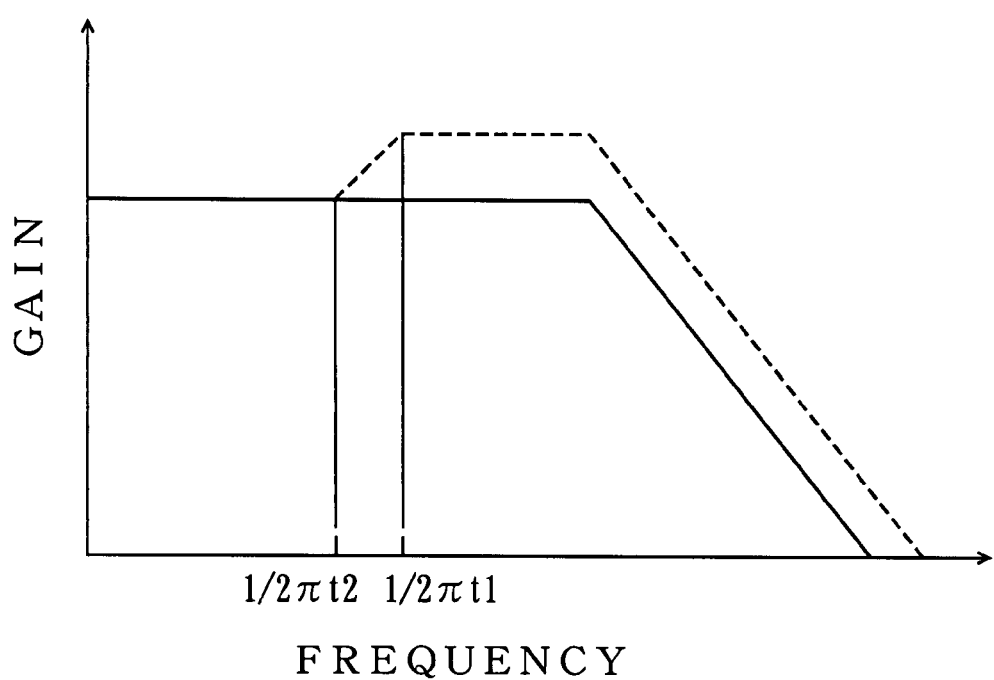

[Fig. 19]
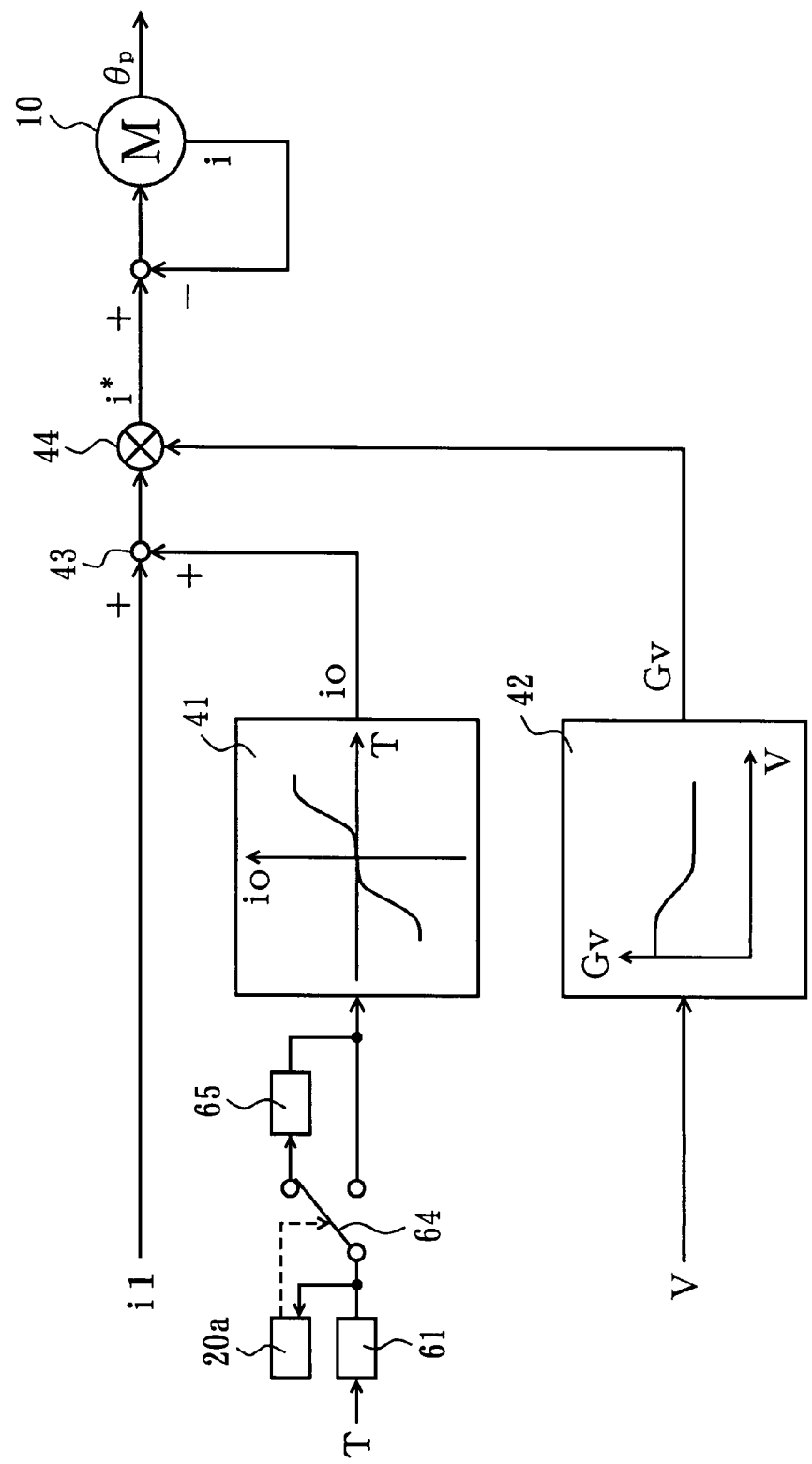

[Fig. 20]
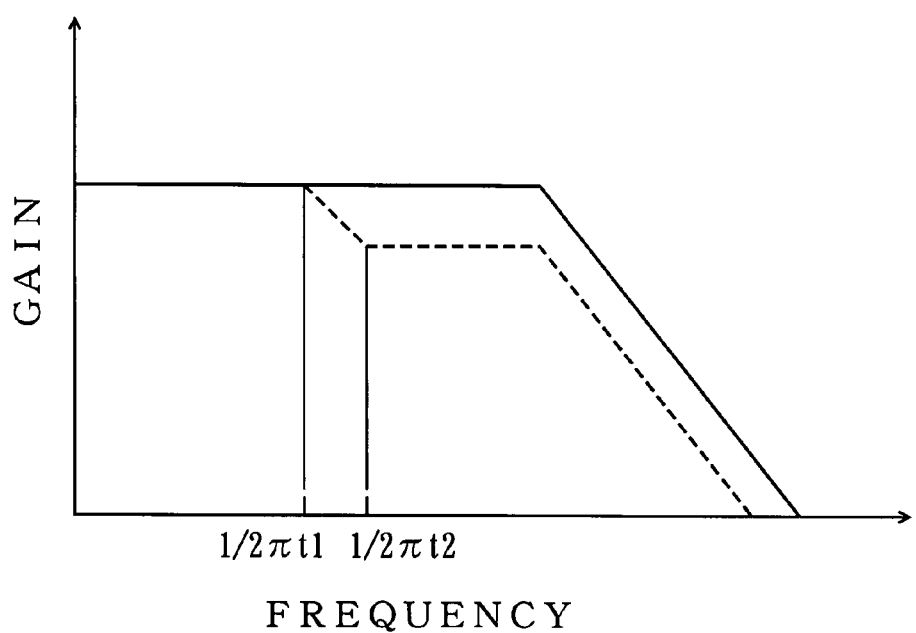

[Fig. 21]
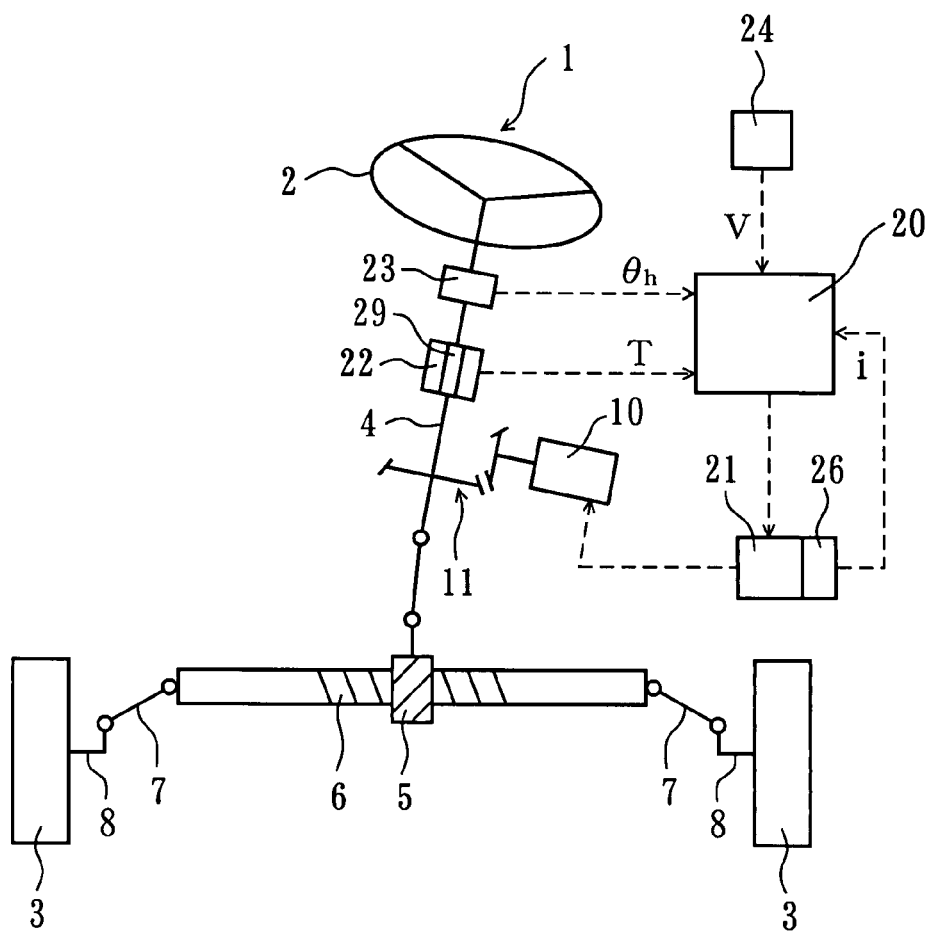

[Fig. 22]
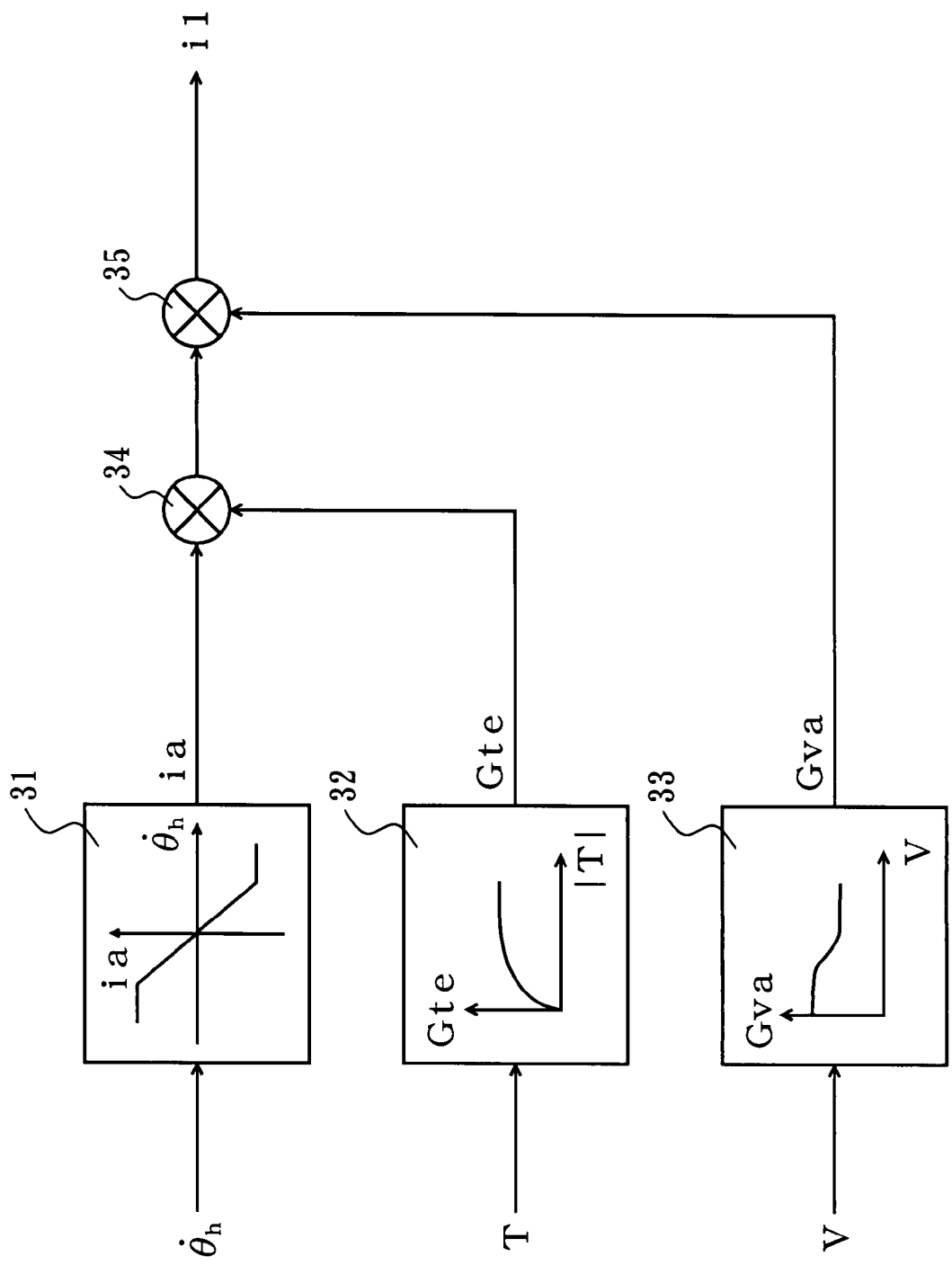

[Fig. 23]
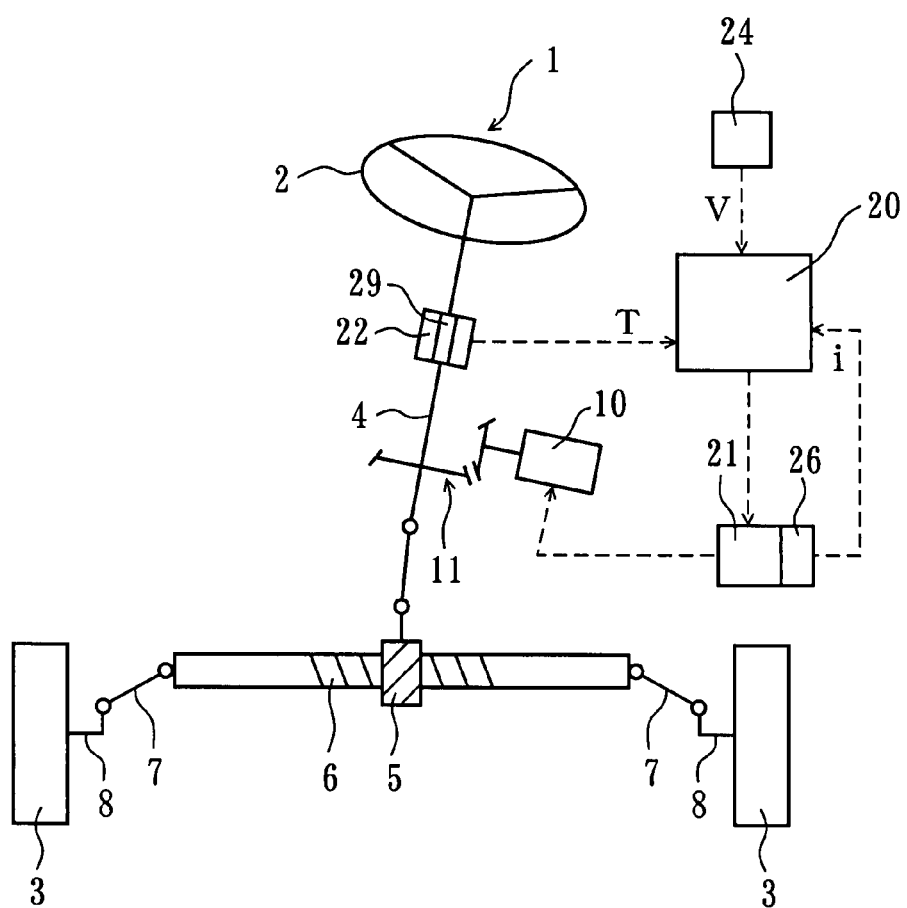

[Fig. 24]
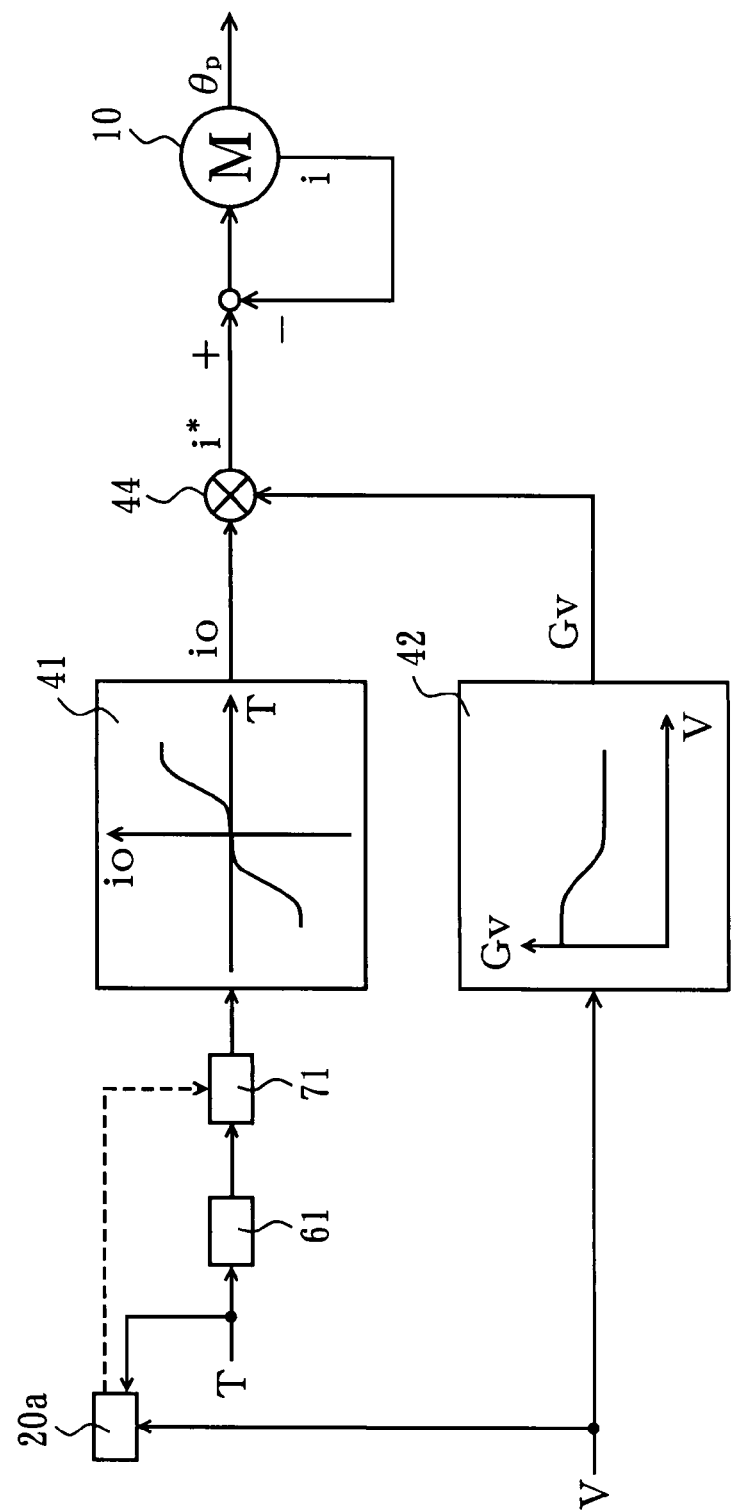

[Fig. 25]
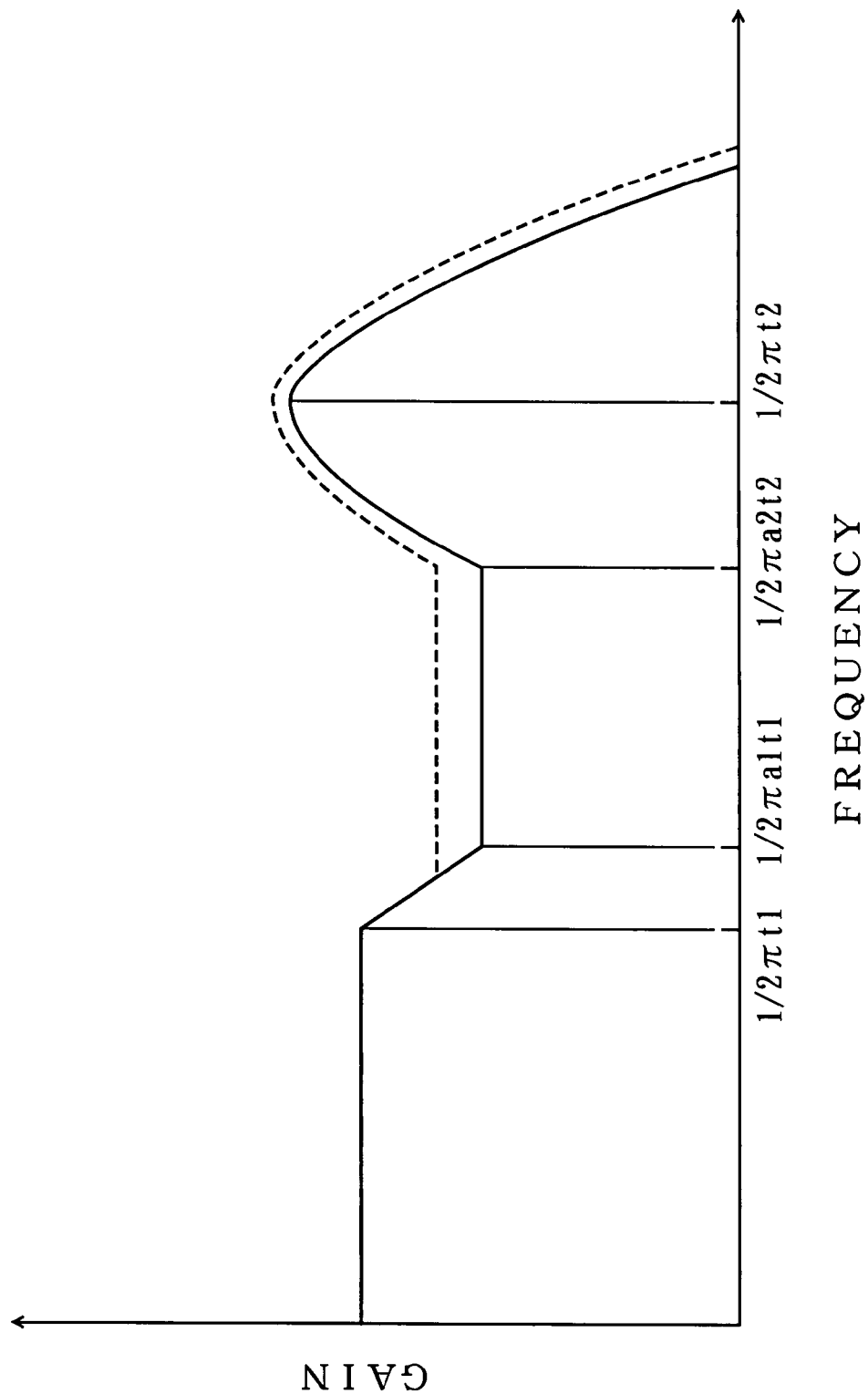

[Fig. 26]
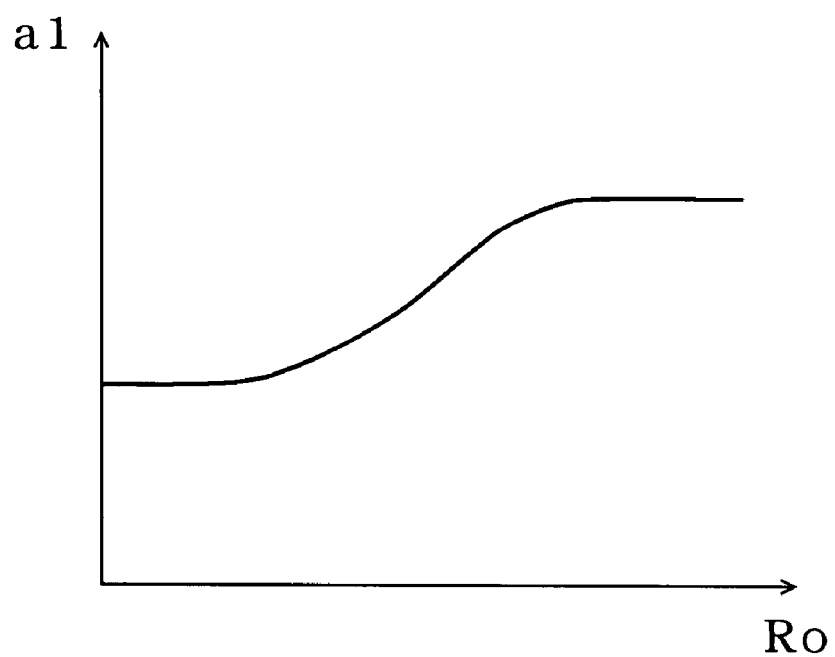

[Fig. 27]
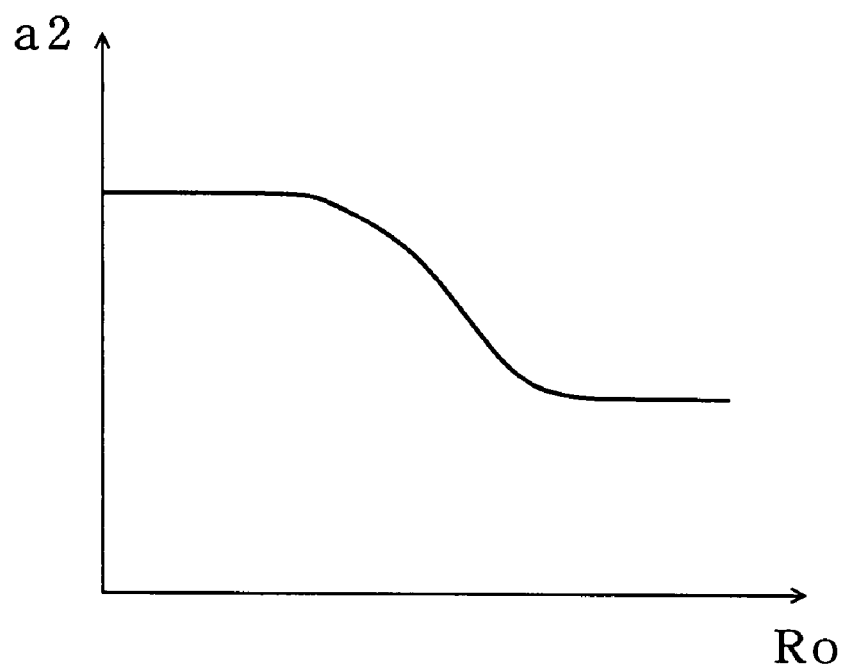

ELECTRIC POWER STEERING APPARATUS

BACKGROUND OF THE INVENTION

The present invention relates to an electric power steering apparatus for providing a steering assist power with a motor.

In an electric power steering apparatus comprising a motor for generating a steering assist power, the steering assist power is varied according to driving conditions such as steering torque detected by a torque sensor and vehicle velocity detected by velocity sensor. Further, the output of the motor providing the steering assist power is corrected according to angular velocity or angular acceleration of rotation of the motor or steering wheel, steering torque, rate of change of steering torque, and acceleration of change of steering angle of vehicle wheels, whereby the responsiveness to the steering operation is improved to compensate the effect of motor inertia, and the steering system is provided with viscosity to decrease the effect of disturbance. Further, in order to prevent the stability of the control system from decreasing due to the noise in the output signal of the torque sensor and the lag in the system, it has been proposed to vary the phase compensation characteristic for the output signal of the torque sensor according to the vehicle velocity (refer to Patent Documents 1 and 2).

Patent Document 1: Japanese Patent Application Laid-open No. 2003-226252
Patent Document 2: Japanese Patent Application Laid-open No. 2004-98754

However, there is a problem in the electric power steering apparatuses employing the conventional technology that the stability of the control system cannot be sufficiently improved, so that oscillations occur and the effect of disturbance cannot be sufficiently decreased. It is an object of the present invention to provide an electric power steering apparatus that can resolve such a problem.

SUMMARY OF THE INVENTION

The present invention is applied to an electric power steering apparatus comprising a motor for generating steering assist power, a torque sensor for detecting steering torque of a steering wheel, means for storing a correspondence relationship between the steering torque and basic assist torque, and means for controlling the motor so that steering assist power is generated according to the basic assist torque corresponding to the detected steering torque.

The inventors have conceived the present invention based on the discovery that the control characteristic of the motor for generating the steering assist power according to the output signal of the torque sensor varies according to an assist gradient that is a rate of change of the basic assist torque to the steering torque. To be more precise, when the assist gradient increases, the phase margin in the open loop control system characteristic of the output to input of the torque sensor decreases, so that stability of the control system decreases. Therefore, the control characteristic can be optimized by varying the correction amount of the output of the motor according to the assist gradient.

In the present invention, the electric power steering apparatus preferably comprises means for determining the assist gradient corresponding to the detected steering torque, means for storing a correspondence relationship between the assist gradient and an assist gradient gain that is in inverse correlation with this assist gradient, means for determining a rotation angular acceleration corresponding value that corresponds to an angular acceleration of rotation of the steering wheel or the motor, means for storing a correspondence relationship between the rotation angular acceleration corresponding value and a motor output correction value that is in direct correlation with this rotation angular acceleration corresponding value, and means for correcting the output of the motor according to a product of the assist gradient gain corresponding to the determined assist gradient and the motor output correction value corresponding to the determined rotation angular acceleration corresponding value.

As a result, in a frequency response characteristic that is represented by the steering frequency of the steering wheel and the gain of the steering torque to the steering angle of the steering wheel, the correspondence relationship between the rotation angular acceleration corresponding value and the motor output correction value can be set such that the gain at a certain frequency is decreased by the correction of the output of the motor at least within a steering frequency range in which the steering wheel is steered by a person. Therefore, the output of the motor for generating the steering assist power is corrected according to a value that is in direct correlation with the angular acceleration of rotation of the steering wheel or the motor, and the gain of the steering torque to the steering angle of the steering wheel is decreased at least within a steering frequency range in which the steering wheel is steered by a person. Thus, the responsiveness of the output of the motor for generating the steering assist power to the steering operation can be improved, and the steering torque can be reduced by rapidly performing the assist of the steering operation.

Moreover, because the correction amount of the output of the motor is in inverse correlation with the assist gradient, the decrease in stability of the control system caused by the increase in the assist gradient can be inhibited by decreasing the control amount, and the occurrence of oscillations can be prevented.

In the present invention, the electric power steering apparatus preferably comprises means for determining the assist gradient corresponding to the detected steering torque, means for storing a correspondence relationship between the assist gradient and an assist gradient gain that is in inverse correlation with this assist gradient, means for determining a rotation angular acceleration corresponding value that corresponds to an angular acceleration of rotation of the motor, means for storing a correspondence relationship between the rotation angular acceleration corresponding value and a motor output correction value that is in inverse correlation with this rotation angular acceleration corresponding value, and means for correcting the output of the motor according to a product of the assist gradient gain corresponding to the determined assist gradient and the motor output correction value corresponding to the determined rotation angular acceleration corresponding value.

Alternatively, in the present invention, the electric power steering apparatus preferably comprises means for determining the assist gradient corresponding to the detected steering torque, means for storing a correspondence relationship between the assist gradient and an assist gradient gain, means for determining a change acceleration corresponding value that corresponds to an acceleration of change of the steering torque, means for storing a correspondence relationship between the change acceleration corresponding value and a motor output correction value that is in direct correlation with this change acceleration corresponding value, and means for correcting the output of the motor according to a product of the assist gradient gain corresponding to the determined assist gradient and the motor output correction value corresponding to the determined change acceleration corresponding value.

As a result, in a frequency response characteristic that is represented by the frequency of disturbance torque inputted into the steering system from the ground surface via the wheels and the gain of the steering torque to the disturbance torque, the correspondence relationship between the rotation angular acceleration corresponding value and the motor output correction value can be set such that a resonance frequency at which the gain takes a peak value is decreased by the correction of the output of the motor. Therefore, the output of the motor for generating the steering assist power is corrected according to a value that is in inverse correlation with the angular acceleration of rotation of the motor, or a value that is in direct correlation with the acceleration of change of the steering torque, whereby the resonance frequency of the steering system at which the gain of the steering torque to the disturbance torque takes a peak value is decreased. In other words, because the input frequency of the disturbance torque corresponding to the resonance frequency decreases, the frequency range of disturbance in which the effect of disturbance is applied is narrowed, so that the effect of disturbance on the steering operation can be reduced.

Moreover, because the correction amount of the output of the motor is in inverse correlation with the assist gradient, the decrease in stability of the control system caused by the increase in the assist gradient can be inhibited by decreasing the control amount, and the occurrence of oscillations can be prevented.

In the present invention, the electric power steering apparatus preferably comprises means for determining an assist gradient corresponding to the detected steering torque, means for storing a correspondence relationship between the assist gradient and an assist gradient gain, means for determining a change rate corresponding value that corresponds to a rate of change of the steering torque, means for storing a correspondence relationship between the change rate corresponding value and a motor output correction value that is in direct correlation with this change rate corresponding value, and means for correcting the output of the motor according to a product of the assist gradient gain corresponding to the determined assist gradient and the motor output correction value corresponding to the determined change rate corresponding value, wherein the assist gradient gain is set to a value more than zero when the assist gradient is equal to or less than a set value.

As a result, in a frequency response characteristic that is represented by the frequency of disturbance torque inputted into the steering system from the ground surface via the wheels and the gain of the steering torque to the disturbance torque, the correspondence relationship between the change rate corresponding value and the motor output correction value can be set such that the gain is decreased at a resonance frequency by the correction of the output of the motor. Therefore, the output of the motor for generating the steering assist power is corrected according to a value that is in direct correlation with the rate of change of the steering torque, and the gain of the steering torque to the disturbance torque is decreased at the resonance frequency, whereby the effect of disturbance on the steering operation can be reduced.

Moreover, the correction amount of the output of the motor varies according to the assist gradient gain, and the assist gradient gain is larger than zero when the assist gradient is equal to or less than the set value. As a result, in a range in which the assist gradient is small because of straight traveling or small steering angle and the effect of disturbance is easily applied, the correction amount of the output of the motor is secured, and the motor is controlled so that the gain of the steering torque to the disturbance torque is decreased at a resonance frequency, whereby the effect of disturbance on the steering operation can be reliably decreased.

In the present invention, the electric power steering apparatus preferably comprises means for determining the assist gradient corresponding to the detected steering torque, a low-pass filter for removing a high-frequency component from an output signal of the torque sensor, assist gradient response phase lead compensation means for advancing phase of the output signal of the torque sensor that passes through the low-pass filter according to decrease of the assist gradient, means for determining a rotation angular velocity corresponding value that corresponds to an angular velocity of rotation of the steering wheel or the motor, means for storing a correspondence relationship between the rotation angular velocity corresponding value and a motor output correction value that is in inverse correlation with this rotation angular velocity corresponding value, and means for correcting the output of the motor according to the motor output correction value corresponding to the determined rotation angular velocity corresponding value.

As a result, in a frequency response characteristic that is represented by the frequency of the disturbance torque inputted into the steering system from the ground surface via the wheels and the gain of the steering torque to the disturbance torque, the correspondence relationship between the rotation angular velocity corresponding value and the motor output correction value can be set such that the gain is decreased at a resonance frequency by the correction of the output of the motor. Therefore, the output of the motor for generating steering assist power is corrected according to a value that is in inverse correlation with the angular velocity of rotation of the steering torque or the motor, and the gain of the steering torque to the disturbance torque is decreased at the resonance frequency, whereby the effect of disturbance on the steering operation can be reduced.

Moreover, in a range in which the assist gradient is small, the detected steering torque corresponding to the basic assist torque is increased relatively to the torque input into the torque sensor, the correction amount of the output of the motor is increased, and the gain of the steering torque to the disturbance torque is decreased in a frequency range where the filter gain is increased, whereby the effect of disturbance on the steering operation can be further decreased.

In the present invention, the electric power steering apparatus preferably comprises means for determining the assist gradient corresponding to the detected steering torque, a low-pass filter for removing a high-frequency component from an output signal of the torque sensor, assist gradient response phase lag compensation means for delaying phase of the output signal of the torque sensor that passes through the low-pass filter according to increase of the assist gradient, means for determining a rotation angular velocity corresponding value that corresponds to an angular velocity of rotation of the steering wheel or the motor, means for storing a correspondence relationship between the rotation angular velocity corresponding value and a motor output correction value that is in inverse correlation with this rotation angular velocity corresponding value, and means for correcting the output of the motor according to the motor output correction value corresponding to the determined rotation angular velocity corresponding value.

As a result, in a frequency response characteristic that is represented by the frequency of the disturbance torque inputted into the steering system from the ground surface via the wheels and the gain of the steering torque to the disturbance torque, the correspondence relationship between the rotation angular velocity corresponding value and the motor output correction value can be set such that the gain is decreased at a resonance frequency by the correction of the output of the motor. Therefore, the output of the motor for generating steering assist power is corrected according to a value that is in inverse correlation with the angular velocity of rotation of the steering torque or the motor, and the gain of the steering torque to the disturbance torque is decreased at the resonance frequency, whereby the effect of disturbance on the steering operation can be reduced.

Moreover, in a range in which the assist gradient is large, the assist gradient can be virtually decreased in an unstable frequency range, so that the stability of the control system can be increased, and the upper limit of the assist gradient can be increased to improve the steering assist characteristic.

In the present invention, it is preferred that an upper limit value is set for the assist gradient that varies according to variation of the steering torque, and the correspondence relationship between the steering torque and the basic assist torque is set such that the set upper limit value of the assist gradient varies according to variation of vehicle velocity, in which there are provided means for detecting the vehicle velocity, means for determining the set upper limit value of the assist gradient at the detected vehicle velocity, a low-pass filter for removing a high-frequency component from an output signal of the torque sensor, and assist gradient response phase compensation means for performing phase lead-lag compensation for the output signal of the torque sensor that passes through the low-pass filter in such a manner that a frequency of an end point of the phase lead and a frequency of a start point of the phase lag vary according to the set upper limit value of the assist gradient at the detected vehicle velocity, and the lead-lag compensation is performed in such a manner that the frequency of the end point of the phase lag decreases and the frequency of the start point of the phase lag increases according to increase of the vehicle velocity.

As a result, as the assist gradient decreases according to increase of the vehicle velocity, the phase margin in the open-loop control system characteristic of the output to input of the torque sensor increases, so that the stability of the control system improves. Further, when the vehicle velocity increases, the set upper limit value of the assist gain decreases and the detected steering torque corresponding to the basic assist torque increases relatively to the torque input into the torque sensor; therefore the responsiveness to the steering operation can be improved. Thus, both the stability of the control system and the responsiveness to the steering operation can be improved.

According to the electric power steering apparatus of the present invention, the stability in controlling the motor for generating steering assist power can be improved, the responsiveness to the steering operation can be improved, and the effect of disturbance on the steering operation can be reduced.

BRIEF DESCRIPTION OF THE DRAWINGS

[FIG. 1] A structural explanatory drawing of the electric power steering apparatus of the first embodiment of the present invention

[FIG. 2] A control block diagram of the electric power steering apparatus of the first embodiment of the present invention

[FIG. 3] A control block diagram for determining a correction basic current in the electric power steering apparatus of the first embodiment of the present invention

[FIG. 4] An illustration of the relationship between the steering torque, the basic assist torque, and the vehicle velocity in the electric power steering apparatus of the embodiments of the present invention

[FIG. 5] A flowchart illustrating the control procedure in the electric power steering apparatus of the first embodiment of the present invention

[FIG. 6] A Bode diagram representing a frequency response characteristic that illustrates a steering characteristic in the electric power steering apparatus of the embodiments of the present invention

[FIG. 7] A structural explanatory drawing of the electric power steering apparatus of the second embodiment of the present invention

[FIG. 8] A control block diagram for determining a correction basic current in the electric power steering apparatus of the second embodiment of the present invention

[FIG. 9] A control block diagram for determining a correction basic current in the electric power steering apparatus of the third embodiment of the present invention

[FIG. 10] A Bode diagram representing a frequency response characteristic that illustrates an effect of disturbance in the electric power steering apparatus of the third embodiment of the present invention

[FIG. 11] A structural explanatory drawing of the electric power steering apparatus of the fourth embodiment of the present invention

[FIG. 12] A control block diagram for determining a correction basic current in the electric power steering apparatus of the fourth embodiment of the present invention

[FIG. 13] A control block diagram for determining a correction basic current in the electric power steering apparatus of the fifth embodiment of the present invention

[FIG. 14] A Bode diagram representing a frequency response characteristic that illustrates an effect of disturbance in the electric power steering apparatus of the fifth embodiment of the present invention

[FIG. 15] A structural explanatory drawing of the electric power steering apparatus of the sixth embodiment of the present invention

[FIG. 16] A control block diagram of the electric power steering apparatus of the sixth embodiment of the present invention

[FIG. 17] A control block diagram for determining a correction basic current in the electric power steering apparatus of the sixth embodiment of the present invention

[FIG. 18] An illustration of a frequency response characteristic of a torque signal used to determine the detected steering torque in the electric power steering apparatus of the sixth embodiment of the present invention

[FIG. 19] A control block diagram of the electric power steering apparatus of the seventh embodiment of the present invention

[FIG. 20] An illustration of a frequency response characteristic of a torque signal used to determine the detected steering torque in the electric power steering apparatus of the seventh embodiment of the present invention

[FIG. 21] A structural explanatory drawing of the electric power steering apparatus of a modification example of the sixth and seventh embodiments of the present invention

[FIG. 22] A control block diagram for determining a correction basic current in the electric power steering apparatus of the modification example of the sixth and seventh embodiments of the present invention

[FIG. 23] A structural explanatory drawing of the electric power steering apparatus of the eighth embodiment of the present invention

[FIG. 24] A control block diagram of the electric power steering apparatus of the eighth embodiment of the present invention

[FIG. 25] An illustration of a frequency response characteristic of a torque signal used to determine the detected steering torque in the electric power steering apparatus of the eighth embodiment of the present invention

[FIG. 26] An illustration of a relationship between a filter constant of the phase compensation filter and a set upper limit value of assist gradient in the electric power steering apparatus of the eighth embodiment of the present invention

[FIG. 27] An illustration of a relationship between another filter constant of the phase compensation filter and a set upper limit value of assist gradient in the electric power steering apparatus of the eighth embodiment of the present invention

EXPLANATION OF REFERENCE NUMERALS 1 electric power steering apparatus
2 steering wheel
10 motor
20 controller
22 torque sensor
23 steering angle sensor
24 vehicle velocity sensor
27 angle sensor
61 low-pass filter
62 switch
63 phase lead compensation filter
64 switch
65 phase lag compensation filter
71 phase compensation filter

DETAILED DESCRIPTION OF THE INVENTION

An electric power steering apparatus 1 for a vehicle of the first embodiment shown in FIG. 1 comprises a mechanism for transmitting the rotation of a steering wheel 2 due to steering operation to wheels 3 so that the steering angle varies. In the present embodiment, when the rotation of the steering wheel 2 is transmitted to a pinion 5 via a steering shaft 4, a rack 6 engaged with the pinion 5 moves, and the movement of the rack 6 is transmitted to the wheels 3 via tie rods 7 and knuckle arms 8, so that the steering angle varies.

A motor 10 is provided for generating steering assist power acting in the path of transmitting the rotation of the steering wheel 2 to the wheels 3. In the present embodiment, the steering assist power is provided by transmitting the rotation of an output shaft of the motor 10 to the steering shaft 4 via a reduction gear mechanism 11.

The motor 10 is connected via a drive circuit 21 to a controller 20 composed of a computer. A torque sensor 22 that detects steering torque T of the steering wheel 2, a steering angle sensor 23 that detects steering angle $\theta_h$ corresponding to rotation angle of the steering wheel 2, a vehicle velocity sensor 24 that detects vehicle velocity V, and a current sensor 26 that detects drive current i of the motor 10 are connected to the controller 20. The steering shaft 4 of the present embodiment is divided into a part on the side of the steering wheel 2 and a part on the side of the pinion 5, the two parts are connected by a torsion bar 29, and a steering torque T obtained by multiplying a torsion angle $(\theta_h - \theta_p)$ of the torsion bar 29, which is a difference between a steering angle $\theta_h$ and a rotation angle $\theta_p$ of the pinion 5, by a spring constant Ks of the torsion bar 29 is detected with the torque sensor 22.

The controller 20 controls the motor 10 so that the motor generates steering assist power according to basic assist torque corresponding to the detected steering torque T. In addition, the controller varies the steering assist power according to the detected vehicle velocity V, and corrects the output of the motor 10 according to the angular acceleration of rotation of the steering wheel 2.

FIG. 2 and FIG. 3 are block diagrams illustrating the control of the motor 10 with the controller 20.

As shown in FIG. 2, a signal outputted from the torque sensor 22 is inputted via a low-pass filter 61 into a calculation part 41 and used to determine a basic assist current io. In the calculation part 41, the correspondence relationship between the steering torque T and the basic assist current io is stored, for example, as a table or a calculation formula, and the basic assist current io corresponding to the detected steering torque T is calculated. The unnecessary high-frequency component is removed from the output signal of the torque sensor 22 with the low-pass filter 61. The correspondence relationship between the steering torque T and the basic assist current io is such that, for example, the absolute value of the basic assist current io increases with the increase in the absolute value of the steering torque T as shown in the calculation part 41. Positive and negative signs of the steering torque T and the basic assist current io during right steering are respectively inverted during left steering.

In the calculation part 42, the correspondence relationship between the vehicle velocity V and basic vehicle velocity gain Gv is stored, for example, as a table or a calculation formula, and the basic vehicle velocity gain Gv corresponding to the determined vehicle velocity V is calculated. The correspondence relationship between the vehicle velocity V and the basic vehicle velocity gain Gv is such that, for example, the basic vehicle velocity gain Gv when the vehicle velocity V is low is larger than that when the vehicle velocity is high as shown in the calculation part 42.

A product of the basic assist current io and the basic vehicle velocity gain Gv corresponds to the basic assist torque. For example, as shown in FIG. 4, if the vehicle velocity V is constant, the absolute value of the basic assist torque To increases up to a set upper limit value as the absolute value of the steering torque T increases, and an assist gradient R (=dTo/dT) that is a rate of change of the basic assist torque To to the steering torque T increases up to a set upper limit value Ro. Moreover, the basic assist torque To varies according to the vehicle velocity V, the basic assist torque To and the assist gradient R increase as the vehicle velocity V decreases when the steering torque T is constant. In other words, the assist gradient R varies according to the variation of the steering torque, the upper limit value Ro is set for the assist gradient R, the correspondence relationship between the steering torque T and the basic assist torque To is set such that the set upper limit value of the assist gradient R varies according to the variation of the vehicle velocity V, and the set correspondence relationship is stored in the controller 20. In the present embodiment, when the absolute value of the steering torque T is equal to or higher than a set value T1, the assist gradient R takes the set upper limit value Ro, and this set upper limit value Ro increases as the vehicle velocity V decreases. The correspondence relationship between the steering torque T and the basic assist torque To is regarded to be stored by storing the correspondence relationship between the steering torque T and the basic assist current io and the correspondence relationship between the vehicle velocity V and the basic vehicle velocity gain Gv as abovementioned. The controller 20 determines the assist gradient R corresponding to the detected steering torque T and the detected vehicle velocity V.

As shown in FIG. 3, in the calculation part 31, the angular acceleration $d^2\theta_h/dt^2$ of rotation is determined as a rotation angle acceleration corresponding value by the second order differential of the steering angle $\theta_h$ determined by the steering angle sensor 23. A set correspondence relationship between the angular acceleration $d^2\theta_h/dt^2$ of rotation and a correction basic current ia that is a motor output correction value is stored, for example, as a table or a calculation formula in the controller 20. The correction basic current ia is in direct correlation with the angular acceleration $d^2\theta_h/dt^2$ of rotation, and is set, for example, as shown in the calculation part 31. To be more precise, the correspondence relationship between the rotation angular acceleration corresponding value and the motor output correction value that is in direct correlation with the rotation angular acceleration corresponding value is stored, and the correction basic current ia corresponding to the determined angular acceleration $d^2\theta_h/dt^2$ of rotation is calculated in the calculation part 31 based on the stored correspondence relationship. Positive and negative signs of the angular acceleration $d^2\theta_h/dt^2$ of rotation and the correction basic current ia during right steering are respectively inverted during left steering.

In the calculation part 32, a set correspondence relationship between the assist gradient R and assist gradient gain Gaa is stored, for example, as a table or a calculation formula, and the assist gradient gain Gaa corresponding to the determined assist gradient R is calculated. The assist gradient gain Gaa is in inverse correlation with the assist gradient R, and the assist gradient gain Gaa decreases as the assist gradient R increases, for example, as shown in the calculation part 32.

In the calculation part 33, a set correspondence relationship between the vehicle velocity V and correction vehicle velocity gain Gva is stored, for example, as a table or a calculation formula, and the correction vehicle velocity gain Gva corresponding to the determined vehicle velocity V is calculated. The correspondence relationship between the vehicle velocity V and the correction vehicle velocity gain Gva is set such that the correction vehicle velocity gain Gva when the vehicle velocity V is high is larger than that when the vehicle velocity is low in the example shown by the figure, but the relationship is not limited to such a setting.

As shown in FIG. 3, a correction current i1 is determined by multiplying the correction basic current ia by the assist gradient gain Gaa and the correction vehicle velocity gain Gva in multiplication parts 34, 35. A sum of the correction current i1 and the basic assist current io is calculated in the addition part 43, and a target drive current i* of the motor 10 is determined by multiplying this sum by the basic vehicle velocity gain Gv in the multiplication part 44. By performing the feedback control of the motor 10 so as to reduce the difference between the target drive current i* and the determined drive current i, the rotation angle $\theta_p$ of the pinion 5 is varied and the steering assist power is applied. In other words, the controller 20 corrects the output of the motor 10 according to the correction current i1 that is a product of the assist gradient gain Gaa corresponding to the determined assist gradient R and the correction basic current ia corresponding to the determined angular acceleration $d^2\theta_h/dt^2$ of rotation. As a result, the correction amount of the output of the motor 10 is varied according to the variation of the assist gradient R.

The flowchart of FIG. 5 shows the control procedure of the motor 10 with the controller 20. First, the detected values V, $\theta_h$, T, and i obtained with the sensors are read (step S1). Then, the angular acceleration $d^2\theta_h/dt^2$ of rotation is determined by the second order time differential of the steering angle $\theta_h$ determined in a time series, and the assist gradient R corresponding to the detected steering torque T and the detected vehicle velocity V is determined (step S2). When the control is started, initial values predetermined as the angular acceleration $d^2\theta_h/dt^2$ of rotation and the assist gradient R can be used. Then, the correction current i1=Gaa·Gva·ia is determined by multiplying the correction basic current ia corresponding to the determined angular acceleration $d^2\theta_h/dt^2$ of rotation by the assist gradient gain Gaa corresponding to the determined assist gradient R and the correction vehicle velocity gain Gva corresponding to the detected vehicle velocity V (step S3), the target drive current i*=Gv·(io+i1) is determined (step S4), and the motor 10 is feedback controlled so as to reduce the difference between the target drive current i* and the detected drive current i (step S5). Whether the control is to be ended is thereafter judged, for example, by whether the ignition switch is ON or OFF (step S6), and when the control is not to be ended, the procedure returns to step S1.

According to the first embodiment, a Bode diagram indicating the frequency response characteristic shown in FIG. 6 can be obtained. In FIG. 6, a steering frequency (Hz) corresponding to a number of reciprocating operations of the steering wheel 2 per unit time is plotted on the abscissa, and a gain (dB) of the steering torque T to the steering angle $\theta_h$ of the steering wheel 2 is plotted on the ordinate. In the frequency response characteristic shown in FIG. 6 that is represented by the steering frequency and the gain of the steering torque T to the steering angle $\theta_h$, the correspondence relationship between the angular acceleration $d^2\theta_h/dt^2$ of rotation and the correction basic current ia is set such that the gain at a certain frequency is decreased by the correction of the output of the motor 10 at least within a steering frequency range (for example, a range of 2 Hz or less) in which the steering wheel is steered by a person.

For example, a torque Ti applied to the steering system with the motor 10 is determined by the following formulas as a sum of the basic assist torque To and the correction torque Ta.

$$Ti = To + Ta \tag{1}$$

$$To = Ka \cdot Ks(\theta_h - \theta_p) \tag{2}$$

$$Ta = Kw \cdot d^2\theta_h/dt^2 \tag{3}$$

Ka is a basic assist control gain and Kw is a steering angular velocity differential (second order differential of the steering angle) control gain.

In the frequency response characteristic shown in FIG. 6, the frequency $\omega_1$ and the attenuation ratio $\zeta_1$ are determined from the following formulas.

$$\omega_1 = \{K/(Jp - Kw)\}^{1/2} \tag{4}$$

$$\zeta_1 = Cp/[2 \cdot \{(Jp-Kw) \cdot \alpha 1/\alpha 2\}^{1/2}] \tag{5}$$

α1 is a weight parameter of the steering operation when the frequency is zero, α2 is a transmission ratio of disturbance when the frequency is zero, and they are represented by the following formulas:

$$\alpha 1 = Ks \cdot K/\{Ks \cdot (1+Ka) + K\}$$

$$\alpha 2 = 1/\{(1+Ka) + K/Ks\}$$

K is an elastic modulus of axial force of the vehicle, Jp is an inertia converted for the pinion shaft in the steering system, Cp is a viscous modulus converted for the pinion shaft in the steering system below the torsion bar 29.

In FIG. 6, the state before the correction of the output of the motor 10 is shown by a solid line, and the state after the correction is shown by a broken line. The correction current i1 is in a direct correlation with the angular acceleration $d^2\theta_h/dt^2$ of rotation of the steering wheel 2, and the gain of the angular acceleration $d^2\theta_h/dt^2$ of rotation is Kw; therefore the frequency $\omega_1$ increases by the correction of the output of the motor according to formula (3). In other words, the broken line representing the state after the correction shifts in the direction to increase the frequency $\omega_1$ relatively to the solid line representing the state before the correction in FIG. 6. As a result, in a steering frequency range in which a person operates the steering wheel 2, the gain of the steering torque to the steering angle of the steering wheel 2 at a certain frequency is decreased by the correction (for example, as shown in FIG. 6, the gain at a frequency of 2 Hz is decreased by the correction); therefore the steering assist is rapidly provided, and the responsiveness to the steering operation is improved.

Further, according to the first embodiment, the control characteristic can be optimized by varying the correction amount of the output of the motor 10 according to the variation of the assist gradient R. To be more precise, the basic assist current io is corrected in the amount of the correction current i1 that is in inverse correlation with the assist gradient R, so that the correction amount of the output of the motor 10 is in inverse correlation with the assist gradient R. As a result, the decrease in stability of the control system based on the increase in the assist gradient R is inhibited by decreasing the control amount of the motor 10, and the occurrence of oscillations can be prevented.

FIG. 7 and FIG. 8 illustrate the second embodiment. The components identical to those of the first embodiment are denoted by identical symbols, and the difference from the first embodiment is explained hereinbelow. The difference from the first embodiment is that the output of the motor 10 is corrected according to the angular acceleration $d^2\theta_m/dt^2$ of rotation of the motor 10 instead of the angular acceleration $d^2\theta_h/dt^2$ of rotation of the steering wheel 2. Therefore, an angle sensor 27 that detects the rotation angle $\theta_m$ of the motor 10 instead of the steering angle sensor 23 is connected to the controller 20. In the calculation part 31, the angular acceleration $d^2\theta_m/dt^2$ of rotation is determined as a rotation angular acceleration corresponding value by the second order differential of the rotation angle $\theta_m$ detected by the angle sensor 27, and the set correspondence relationship between the angular acceleration $d^2\theta_m/dt^2$ of rotation and the correction basic current ia is stored. The correspondence relationship between the angular acceleration $d^2\theta_m/dt^2$ of rotation and the correction basic current ia is set such that the correction basic current ia is in direct correlation with the angular acceleration $d^2\theta_m/dt^2$ of rotation, and the correction basic current ia corresponding to the determined angular acceleration $d^2\theta_m/dt^2$ of rotation is calculated in the calculation part 31 based on the stored correspondence relationship.

Other features are similar to the first embodiment, the correction current i1 is determined by multiplying the correction basic current ia by the assist gradient gain Gaa and the correction vehicle velocity gain Gva, and the target drive current i* of the motor 10 is determined by multiplying the sum of the correction current i1 and the basic assist current io by the basic vehicle velocity gain Gv, whereby the correction amount of the output of the motor 10 is varied according to the variation of the assist gradient R. As a result, the electric power steering apparatus of the second embodiment is able to have functions and effects identical to those of the first embodiment. For example, a characteristic similar to that shown in FIG. 6 in the first embodiment can be obtained, and responsiveness to the steering operation can be improved, by substituting the steering angle $\theta_h$ with the rotation angle $\theta_m$ in the above Formula (3) and substituting the steering angular velocity differential control gain Kw with the motor rotation angular velocity differential (second order differential of the rotation angle of the motor) control gain Km in Formulas (3), (4), and (5).

FIG. 9 and FIG. 10 illustrate the third embodiment. The components identical to those of the second embodiment are denoted by identical symbols and the difference from the second embodiments is explained hereinbelow. The difference from the second embodiment is that the correspondence relationship between the angular acceleration $d^2\theta_m/dt^2$ of rotation and the correction basic current ia in the third embodiment is set such that the correction basic current ia is in inverse correlation with the angular acceleration $d^2\theta_m/dt^2$ of rotation.

Other features are similar to the second embodiment, the correction current i1 is determined by multiplying the correction basic current ia by the assist gradient gain Gaa and the correction vehicle velocity gain Gva, and the target drive current i* of the motor 10 is determined by multiplying the sum of the correction current i1 and the basic assist current io by the basic vehicle velocity gain Gv, whereby the correction amount of the output of the motor 10 is varied according to the variation of the assist gradient R.

The electric power steering apparatus of the third embodiment is able to have functions and effects different from those of the second embodiment, and a Bode diagram representing the frequency response characteristic shown in FIG. 10 can be obtained. In FIG. 10, the input frequency (Hz) of the disturbance torque inputted into the steering system from the ground surface via the wheels 3 is plotted on the abscissa, and the gain (dB) of the steering torque T to the disturbance torque is plotted on the ordinate. In the frequency response characteristic represented by the frequency of the disturbance torque and the gain of the steering torque T to the disturbance torque shown in FIG. 10, the correspondence relationship between the angular acceleration $d^2\theta_m/dt^2$ of rotation and the correction basic current ia is set such that the resonance frequency at which the gain takes a peak value is decreased by the correction of the output of the motor 10.

For example, a torque Ti applied to the steering system by the motor 10 is determined by the following formulas.

$$Ti = To + Ta \quad (1)$$

$$To = Ka \cdot Ks(\theta_h - \theta_p) \quad (2)$$

$$Tb = Km \cdot d^2\theta_m/dt^2 \quad (6)$$

Km is a motor rotation angular velocity differential (second order differential of the rotation angle of the motor) control gain.

In the frequency response characteristic shown in FIG. 10, the frequency $\omega_2$ and the attenuation ratio $\zeta_2$ are determined from the following formulas.

$$\omega_2 = [\{Ks \cdot (1+Ka)+K\}/(Jp \cdot Km)]^{1/2} \quad (7)$$

$$\zeta_2 = Cp/[2 \cdot \{(Jp-Km) \cdot Ks/\alpha 2\}^{1/2}] \quad (8)$$

In FIG. 10, the state before the correction of the output of the motor 10 is shown by a solid line, and the state after the correction is shown by a broken line. The correction current i1 is in inverse correlation with the angular acceleration $d^2\theta_m/dt^2$ of rotation of the motor 10, and the gain of the angular acceleration $d^2\theta_m/dt^2$ of rotation is Km; therefore when the output of the motor 10 is corrected, the frequency $\omega_2$ decreases according to formula (7). In other words, the broken line representing the state after the correction shifts in the direction to decrease the frequency $\omega_2$ relatively to the solid line representing the state before the correction in FIG. 10 (for example, the frequency of the peak point P of the gain in FIG.

10 is decreased by the correction). As a result, the resonance frequency of the steering system at which the gain of the steering torque T to the disturbance torque takes a peak value is decreased by the correction the output of the motor. Therefore, the input frequency of the disturbance torque corresponding to the resonance frequency decreases, whereby the frequency range of disturbance in which the effect of disturbance is applied is narrowed, so that the effect of disturbance on the steering operation can be inhibited.

Moreover, according to the third embodiment, the control characteristic can be optimized by varying the correction amount of the output of the motor 10 according to the variation of the assist gradient R. To be more precise, the basic assist current io is corrected in the amount of the correction current i1 that is in inverse correlation with the assist gradient R, so that the correction amount of the output of the motor 10 is in inverse correlation with the assist gradient R. As a result, the decrease in stability of the control system based on the increase in the assist gradient R is inhibited by decreasing the control amount of the motor 10, and the occurrence of oscillations can be prevented.

FIG. 11 and FIG. 12 illustrate the fourth embodiment. The components identical to those of the third embodiment are denoted by identical symbols and the difference from the third embodiments is explained hereinbelow. The difference from the third embodiments is that the output of the motor 10 is corrected according to acceleration $d^2T/dt^2$ of change of the steering torque T instead of the angular acceleration of rotation of the motor 10. Accordingly, the angle sensor 27 is unnecessary, the acceleration $d^2T/dt^2$ of change is determined in the calculation part 31 as a change acceleration corresponding value instead of the rotation angular acceleration corresponding value by the second order differential of the steering torque T detected by the torque sensor 22, and the set correspondence relationship between the acceleration $d^2T/dt^2$ of change and the correction basic current ia is stored. The correspondence relationship between the acceleration $d^2T/dt^2$ of change and the correction basic current ia is set such that the correction basic current ia is in direct correlation with the acceleration $d^2T/dt^2$ of change, and the correction basic current ia corresponding to the determined acceleration $d^2T/dt^2$ of change is calculated in the calculation part 31 based on the stored correspondence relationship.

Other features are similar to the third embodiment, the correction current i1 is determined by multiplying the correction basic current ia by the assist gradient gain Gaa and the correction vehicle velocity gain Gva, and the target drive current i* of the motor 10 is determined by multiplying the sum of the correction current i1 and the basic assist current io by the basic vehicle velocity gain Gv, whereby the correction amount of the output of the motor 10 is varied according to the variation of the assist gradient R.

According to the fourth embodiment, a characteristic similar to that shown in FIG. 10 in the third embodiment can be obtained. For example, a torque Ti applied to the steering system by the motor 10 is determined by the following formulas.

$$Ti=To+Ta \quad (1)$$

$$To=Ka\cdot Ks(\theta_h-\theta_p) \quad (2)$$

$$Tb=Kdd\cdot d^2Ks(\theta_h-\theta_p)/dt \quad (9)$$

Kdd is a torque second order differential control gain.

In the frequency response characteristic shown in FIG. 10, the frequency $\omega_2$ and the attenuation ratio $\zeta_2$ are determined from the following formulas.

$$\omega_2=[\{Ks\cdot(1+Ka)+K\}/(Jp+Kdd)]^{1/2} \quad (10)$$

$$\zeta_2=Cp/[2\cdot\{(Jp+Ks\cdot Kdd)\cdot Ks/\alpha 2\}^{1/2}] \quad (11)$$

The correction basic current ia is in direct correlation with the acceleration $d^2T/dt^2$ of change of the steering torque T, and the gain of the acceleration $d^2T/dt^2$ of change is Kdd; therefore when the output of the motor is corrected, the frequency $\omega_2$ decreases according to formula (10). In other words, similarly to the third embodiment, the broken line representing the state after the correction shifts in the direction to decrease the frequency $\omega_2$ relatively to the solid line representing the state before the correction in FIG. 10. Moreover, because the basic assist current io is corrected in the amount of the correction current i1 that is in inverse correlation with the assist gradient R, the correction amount of the output of the motor 10 is in inverse correlation with the assist gradient R. As a result, the decrease in stability of the control system due to the increase in the assist gradient R is inhibited by decreasing the control amount of the motor 10, and the occurrence of oscillations can be prevented.

FIG. 13 and FIG. 14 illustrate the fifth embodiment. The components identical to those of the fourth embodiment are denoted by identical symbols, and the difference from the fourth embodiment is explained. The difference from the fourth embodiment is that the output of the motor 10 is corrected according to the rate dT/dt of change of the steering torque T instead of the acceleration $d^2T/dt^2$ of change of the steering torque T. Accordingly, the rate dT/dt of change is determined in the calculation part 31 as a change rate corresponding value instead of the change acceleration corresponding value by the differential of the steering torque T detected by the torque sensor 22, and the set correspondence relationship between the rate dT/dt of change and correction basic current ia is stored. The correspondence relationship between the rate dT/dt of change and the correction basic current ia is set such that the correction basic current ia is in direct correlation with the rate dT/dt of change, and the correction basic current ia corresponding to the determined rate dT/dt of change is calculated in the calculation part 31 based on the correspondence relationship.

The correspondence relationship between the assist gradient R and the assist gradient gain Gaa in the fifth embodiment is different from that in the fourth embodiment, the set correspondence relationship between the assist gradient R and the assist gradient gain Gaa is stored, for example, as a table or a calculation formula in the calculation part 32, and the assist gradient gain Gaa corresponding to the determined assist gradient R is calculated. The assist gradient gain Gaa is set to a value more than zero when the assist gradient R is equal to or less than a set value. The set value of the assist gradient R can be appropriately set such that the effect of disturbance on the steering operation can be reduced in a range in which the assist gradient is small. The assist gradient gain Gaa can be in direct correlation with the assist gradient R as shown by a solid line in the figure, or in inverse correlation with that as shown by a broken line in the figure.

The correspondence relationship between the vehicle velocity V and the correction vehicle velocity gain Gva in the calculation part 33 in the fifth embodiment is such that the correction vehicle velocity gain Gva is constant even when the vehicle velocity V varies, but the relationship is not limited to such a setting.

Other features of the fifth embodiment are similar to the fourth embodiment, the correction current i1 is determined by multiplying the correction basic current ia by the assist gradient gain Gaa and the correction vehicle velocity gain Gva, and the target drive current i* of the motor 10 is determined by multiplying the sum of the correction current i1 and the basic assist current io by the basic vehicle velocity gain Gv, whereby the correction amount of the output of the motor 10 is varied according to the variation of the assist gradient R.

The electric power steering apparatus of the fifth embodiment is able to have functions and effects different from those of the second embodiment, and a Bode diagram representing the frequency response characteristic shown in FIG. 14 can be obtained. In FIG. 14, the input frequency (Hz) of the disturbance torque inputted into the steering system from the ground surface via the wheels 3 is plotted on the abscissa, and the gain (dB) of the steering torque T to the disturbance torque is plotted on the ordinate. In the frequency response characteristic represented by the frequency of the disturbance torque and the gain of the steering torque T to the disturbance torque shown in FIG. 14, the correspondence relationship between the rate dT/dt of change and the correction basic current ia is set such that the gain is decreased at a resonance frequency by the correction of the output of the motor 10.

For example, a torque Ti applied to the steering system by the motor 10 is determined by the following formulas:

$$Ti = To + Ta \quad (1)$$

$$To = Ka \cdot Ks(\theta_h - \theta_p) \quad (2)$$

$$Tb = Kd \cdot d\{Ks(\theta_h - \theta_p)\}/dt \quad (12)$$

Kd is a torque differential control gain.

In the frequency response characteristic shown in FIG. 14, the frequency $\omega_2$ and the attenuation ratio $\zeta_2$ are determined from the following formulas.

$$\omega_2 = [\{Ks \cdot (1 + Ka) + K\}/Jp]^{1/2} \quad (13)$$

$$\zeta_2 = (Cp + Ks \cdot Kd)/\{2 \cdot (Jp \cdot Ks/\alpha 2)^{1/2}\} \quad (14)$$

In FIG. 14, the state before the correction of the output of the motor 10 is shown by a solid line, and the state after the correction is shown by a broken line. The correction basic current ia is in a direct correlation with the rate dT/dt of change of the steering torque T, and the gain of the rate dT/dt of change is Kd; therefore when the output of the motor is corrected, the attenuation ratio $\zeta_2$ increases according to the abovementioned formula (14). In other words, the broken line representing the state after the correction shifts in the direction to decrease the peak value of the gain at the resonance frequency relatively to the solid line representing the state before the correction in FIG. 14 (for example, the gain corresponding to the peak point P of the gain in FIG. 14 is decreased by the correction). As a result, the effect of disturbance on the steering operation can be inhibited.

Moreover, according to the fifth embodiment, the control characteristic can be optimized by varying the correction amount of the output of the motor 10 according to the variation of the assist gradient R. To be more precise, the correction amount of the output of the motor 10 varies according to the assist gradient gain Gaa, and the assist gradient gain Gaa is larger than zero when the assist gradient R is equal to or less than a set value. As a result, in a range in which the assist gradient R is small because of straight traveling or small steering angle and the effect of disturbance is easily applied, the correction amount of the output of the motor is secured, and the motor 10 is controlled so that the gain of the steering torque to the disturbance torque is decreased at a resonance frequency, whereby the effect of disturbance on the steering operation can be reliably decreased.

FIGS. 15 to 18 illustrate the sixth embodiment. The components identical to those of the first embodiment are denoted by identical symbols, and the difference from the first embodiment is explained hereinbelow. The difference from the first embodiments is that the output of the motor 10 is corrected according to the angular velocity $d\theta_m/dt$ of rotation of the motor 10 instead of the angular acceleration $d^2\theta_h/dt^2$ of rotation of the steering wheel 2. Therefore, an angle sensor 27 that detects the rotation angle $\theta_m$ of the motor 10 is connected to the controller 20 instead of the steering angle sensor 23 as shown in FIG. 15. The angular velocity $d\theta_m/dt$ of rotation is determined as a rotation angular velocity corresponding value instead of the rotation angular acceleration corresponding value by the differential of the rotation angle $\theta_m$ detected by the angle sensor 27 in the calculation part 31 as shown in FIG. 17, and the set correspondence relationship between the angular velocity $d\theta_m/dt$ of rotation and the correction basic current ia is stored. The correspondence relationship between the angular velocity $d\theta_m/dt$ of rotation and the correction basic current ia is set such that the correction basic current ia is in inverse correlation with the angular velocity $d\theta_m/dt$ of rotation, and the correction basic current ia corresponding to the determined angular velocity $d\theta_m/dt$ of rotation is calculated in the calculation part 31 based on the stored correspondence relationship.

The correspondence relationship between the absolute value of the steering torque T and the torque gain Gte is stored instead of the set correspondence relationship between the assist gradient R and the assist gradient gain Gaa, for example, as a table or a calculation formula, and the torque gain Gte corresponding to the determined steering torque T is calculated in the calculation part 32.

The correspondence relationship between the vehicle velocity V and the correction vehicle velocity gain Gva in the calculation part 33 illustrated by the figure is set such that the correction vehicle velocity gain Gva when the vehicle velocity V is high is smaller than that when it is low, but the relationship is not limited to such a setting.

As shown in FIG. 16, the low-pass filter 61 is selectively connected to the calculation part 41 and the phase lead compensation filter 63 via a switch 62, and a phase lead compensation filter 63 is connected to the calculation part 41. The compensation control part 20a of the controller 20 determines the assist gradient R corresponding to the detected steering torque T, and operates the switch 62 according to the determined assist gradient R. By operating the switch 62, the low-pass filter 61 is connected to the phase lead compensation filter 63 when the assist gradient R is equal to or less than a set value, and connected to the calculation part 41 when the assist gradient R exceeds the set value. The set value of the assist gradient R can be set so as to reduce sufficiently the effect of disturbance on the steering operation in a range in which the assist gradient R is small. The controller 20, the switch 62, and the phase lead compensation filter 63 thus constitute the assist gradient response phase lead compensation means for advancing the phase of the output signal of the torque sensor 22 that passes through the low-pass filter 61 according to decrease of the assist gradient R.

The controller 20 determines the target drive current i* of the motor 10 by multiplying the sum of the correction current i1, which is determined by multiplying the correction basic current ia by the torque gain Gte and the correction vehicle velocity gain Gva, and the basic assist current io by the basic vehicle velocity gain Gv. As a result, the output of the motor 10 is corrected according to the correction basic current ia, and the phase of the output signal of the torque sensor 22 is varied by the variation of the assist gradient R; therefore the correction amount of the output of the motor 10 is varied according to the variation of the assist gradient R.

The electric power steering apparatus of the sixth embodiment is able to have the following functions and effects that are different from those obtained in the first embodiment.

For example, a torque Ti applied to the steering system by the motor 10 is determined by the following formulas:

$$Ti = To + Ta \quad (1)$$

$$To = Ka \cdot Ks(\theta_h - \theta_p) \quad (2)$$

$$Tb = -Kdo \cdot d\theta_m/dt \quad (15)$$

Kdo is a control gain of the angular velocity $d\theta_m/dt$ of rotation.

In the frequency response characteristic represented by the input frequency (Hz) of the disturbance torque and the gain of the steering torque T to the disturbance torque, the frequency $\omega_2$ and the attenuation ratio $\zeta_2$ are determined from the following formulas.

$$\omega_2 = [\{Ks \cdot (1+Ka) + K\}/Jp]^{1/2} \quad (16)$$

$$\zeta_2 = (Cp + Kdo)/\{2 \cdot (Jp \cdot Ks/\alpha 2)^{1/2}\} \quad (17)$$

The correction basic current ia is in a inverse correlation with the angular velocity $d\theta_m/dt$ of rotation of the motor 10, and the gain of the angular velocity $d\theta_m/dt$ of rotation is Kdo; therefore when the output of the motor is corrected, the attenuation ratio $\zeta_2$ increases according to the abovementioned formula (17). Therefore, similarly to the frequency response characteristic in the fifth embodiment shown in FIG. 14, a characteristic can be obtained in which the broken line representing the state after the correction shifts in the direction to decrease the peak value of the gain at the resonance frequency relatively to the solid line representing the state before the correction. In other words, in the frequency response characteristic that is represented by the frequency of the disturbance torque inputted into the steering system from the ground surface via the wheels 3 and the gain of the steering torque T to the disturbance torque, the correspondence relationship between the angular velocity $d\theta_m/dt$ of rotation and the correction basic current ia is set such that the gain is decreased at the resonance frequency by the correction of the output of the motor 10. As a result, the effect of disturbance on the steering operation can be inhibited.

Moreover, the phase of the output signal of the torque sensor 22 that passes through the low-pass filter 61 is advanced by the decrease in the assist gradient R, whereby the correction amount of the output of the motor 10 is varied according to the variation of the assist gradient R. For example, FIG. 18 shows a frequency response characteristic of a torque signal that is inputted into the calculation part 41 to determine the basic assist current io, in which the frequency of the output signal of the torque sensor 22 is plotted on the abscissa, and the gain of the torque input into the calculation part 41 to the torque input into the torque sensor 22 is plotted on the ordinate. In FIG. 18, the characteristic in the case where the phase of the signal is not advanced is represented by a solid line, and the characteristic in the case where the phase is advanced by the phase lead compensation filter 63 is represented by a broken line. Where the transfer function of the phase lead compensation filter 63 is denoted by Gpa, the transfer function of the low-pass filter 61 is denoted by Gf, the input into the torque sensor 22 is denoted by Si, and the output from the phase lead compensation filter 63 is denoted by Soa, the equation Soa=Gpa·Gf·Si is valid. Here, where t1 and t2 stand for time constants, s stands for a Laplace operator, Gpa=(1+t2·s)/(1+t1·s), and t2>t1, the frequency of a start point of the phase lead is $1/(2\pi \cdot t2)$, and the phase lead ends at a frequency of $1/(2\pi \cdot t1)$. As a result, in a range in which the assist gradient R is small, the gain of the torque input into the calculation part 41 to the torque input into the torque sensor 22 increases, whereby the detected steering torque T corresponding to the basic assist torque To can be increased relatively to the torque input into the torque sensor 22, the correction amount of the output of the motor 10 can be increased, the gain of the steering torque T to the disturbance torque can be decreased at the resonance frequency, and the effect of disturbance on the steering operation can be reduced.

FIGS. 19 and 20 illustrate the seventh embodiment. The components identical to those of the sixth embodiment are denoted by identical symbols, and the difference from the sixth embodiment is explained hereinbelow. The difference from the sixth embodiments is that the low-pass filter 61 is selectively connected to the calculation part 41 and a phase lag compensation filter 65 via a switch 64, and the phase lag compensation filter 65 is connected to the calculation part 41 as shown in FIG. 19. The compensation control part 20a of the controller 20 determines the assist gradient R corresponding to the detected steering torque T, and operates the switch 64 according to the determined assist gradient R. By operating the switch 64, the low-pass filter 61 is connected to the phase lag compensation filter 65 when the assist gradient R is equal to or more than a set value, and connected to the calculation part 41 when the assist gradient R is less than the set value. The set value of the assist gradient R can be set so as to increase the stability of the control system in a range in which the assist gradient R is large. The controller 20, the switch 64 and the phase lag compensation filter 65 thus constitute the assist gradient response phase lag compensation means for delaying the phase of the output signal of the torque sensor 22 that passes through the low-pass filter 61 according to the increase of the assist gradient R.

Other features are similar to the sixth embodiment, the target drive current i* of the motor 10 is determined by multiplying the sum of the correction current i1, which is determined by multiplying the correction basic current ia by the torque gain Gte and the correction vehicle velocity gain Gva, and the basic assist current io by the basic vehicle velocity gain Gv. The output of the motor 10 is thereby corrected according to the correction basic current ia. According to the electric power steering apparatus of the seventh embodiment, similarly to the sixth embodiment, in the frequency response characteristic that is represented by the frequency of the disturbance torque inputted into the steering system from the ground surface via the wheels 3 and the gain of the steering torque T to the disturbance torque, the correspondence relationship between the angular velocity $d\theta_m/dt$ of rotation and the correction basic current ia is set such that the gain is decreased at the resonance frequency by the correction of the output of the motor 10, whereby the effect of disturbance on the steering operation can be inhibited.

Moreover, the electric power steering apparatus of the seventh embodiment is able to have functions and effects different from those of the sixth embodiment. To be more precise, the phase of the output signal of the torque sensor 22 passing through the low-pass filter 61 is delayed by the increase in the assist gradient R, whereby the correction amount of the output of the motor 10 is varied according to the variation of the assist gradient R. For example, FIG. 20 represents a frequency response characteristic of a torque signal that is inputted into the calculation part 41 to determine the basic assist current io, in which the frequency of the output signal of the torque sensor 22 is plotted on the abscissa, and the gain of the torque input into the calculation part 41 to the torque input into the torque sensor 22 is plotted on the ordinate. In FIG. 20, the characteristic in the case where the phase of the signal is not delayed is represented by a solid line, and the characteristic in the case where the phase is delayed by the phase lag compensation filter 65 is represented by a broken line. Where the transfer function of the phase lag compensation filter 65 is denoted by Gpd, the transfer function of the low-pass filter 61 is denoted by Gf, the input into the torque sensor 22 is denoted by Si, and the output from the phase lag compensation filter 65 is denoted by Sod, the equation Sod=Gpd·Gf·Si is valid. Here, where t1 and t2 stand for time constants, s stands for a Laplace operator, Gpd=(1+t2·s)/(1+t1·s), and t1>t2, the frequency of a start point of the phase lag is $1/(2\pi\cdot t1)$, and the phase lag ends at a frequency of $1/(2\pi\cdot t2)$. As a result, because the gain of the torque input into the calculation part 41 to the torque input into the torque sensor 22 decreases in a range in which the assist gradient R is large, the detected steering torque corresponding to the basic assist torque To is reduced relatively to the torque input into the torque sensor 22, whereby the stability of the control system can be improved by decreasing the correction amount of the output of the motor 10, and the steering assist characteristic can be improved by increasing the upper limit of the assist gradient R.

As a modification example of the sixth embodiment, or as a modification example of the seventh embodiment, the output of the motor 10 can be corrected according to the angular velocity $d\theta_h/dt$ of rotation of the steering wheel 2 instead of the angular velocity $d\theta_m/dt$ of rotation of the motor 10. In this case, as shown in FIG. 21, the steering angle sensor 23 instead of the angle sensor 27 is connected to the controller 20, and as shown in FIG. 22, the angular velocity $d\theta_h/dt$ of rotation is determined as a rotation angular velocity corresponding value in the calculation part 31 by the differential of the steering angle $\theta_h$ detected by the steering angle sensor 23, and a set correspondence relationship between the angular velocity $d\theta_h/dt$ of rotation and the correction basic current ia is stored. The correspondence relationship between the angular velocity $d\theta_h/dt$ of rotation and the correction basic current ia is set such that the correction basic current ia is in inverse correlation with the angular velocity $d\theta_h/dt$ of rotation, and the correction basic current ia corresponding to the determined angular velocity $d\theta_h/dt$ of rotation is calculated in the calculation part 31 based on the stored correspondence relationship. The effect of disturbance on the steering operation can be inhibited by replacing the rotation angle $\theta_m$ with the steering angle $\theta_h$ in the abovementioned Formula (15), and replacing the control gain Kdo of the angular velocity $d\theta_m/dt$ of rotation with the control gain of the angular velocity $d\theta_h/dt$ of rotation in the Formulas (15), (16), (17). Other features of the modification example of the sixth embodiment are similar to those of the sixth embodiment, and the modification example is able to have functions and effects identical to those of the sixth embodiment; and other features of the modification example of the seventh embodiment are similar to those of the seventh embodiment, and the modification example is able to have functions and effects identical to those of the seventh embodiment.

FIGS. 23 to 27 illustrate the eighth embodiment. The components identical to those of the first embodiment are denoted by identical symbols, and the difference from the first embodiment is explained hereinbelow. The difference from the first embodiments is that the correction of the output of the motor 10 according to the angular acceleration $d^2\theta_h/dt^2$ of rotation of the steering wheel 2 is not performed. Accordingly, the steering angle sensor 23 is not provided. As shown in FIG. 24, the low-pass filter 61 is connected via a phase compensation filter 71 to the calculation part 41. The phase compensation filter 71 performs phase lead-lag compensation for the output signal of the torque sensor 22 that passes through the low-pass filter 61. The compensation control part 20a of the controller 20 determines a set upper limit value Ro of the assist gradient R at the detected vehicle velocity V based on the correspondence relationship shown in FIG. 4, and varies the frequency of an end point of the phase lead and the frequency of a start point of the phase lag in the phase lead-lag compensation with the phase compensation filter 71 according to the set upper limit value Ro of the determined assist gradient R. As a result, the detected steering torque T corresponding to the basic assist torque To varies according to the variation of the assist gradient R, and the correction amount of the output of the motor 10 is varied by the variation of the basic assist torque To.

FIG. 25 represents a frequency response characteristic of a torque signal that is inputted into the calculation part 41 to determine the detected steering torque T, in which the frequency of the output signal of the torque sensor 22 is plotted on the abscissa, and the gain of the output from the phase compensation filter 71 to the input into the torque sensor 22 is plotted on the ordinate. Where the transfer function of the phase compensation filter 71 is denoted by Gp, the transfer function of the low-pass filter 61 is denoted by Gf, the input into the torque sensor 22 is denoted by Si, and the output from the phase compensation filter 71 is denoted by So, the equation So=Gp·Gf·Si is valid. Here, where t1, t2, and t3 stand for time constants, a1 and a2 stand for filter constants, s stands for a Laplace operator, Gp·Gf={(1+a1·t1·s)·(1+a2·t2·s)}/{(1+t1·s)·(1+t2·s)·(1+t3·s)}, t1>t2, a1≦1, and a2>1, the frequency of a start point of the phase lag is $1/(2\pi\cdot t1)$, the phase lag ends at a frequency of $1/(2\pi\cdot a1\cdot t1)$, the frequency of a start point of the phase lead is $1/(2\pi\cdot a2\cdot t2)$, and the phase lead ends at a frequency of $1/(2\pi\cdot t2)$. The filter constants a1 and a2 are taken as functions of the set upper limit value Ro of the assist gradient R, and the correspondence relationship between the filter constant a1 and the set upper limit value Ro and the correspondence relationship between the filter constant a2 and the set upper limit value Ro are stored in the controller 20. In the present embodiment, as shown in FIG. 26, the filter constant a1 is in direct correlation with the set upper limit value Ro, and as shown in FIG. 27, the filter constant a2 is in inverse correlation with the set upper limit value Ro. The compensation control part 20a determines the filter constants a1 and a2 corresponding to the set upper limit value Ro determined based on the detected vehicle velocity V, and sets the filter constants a1 and a2 of the phase compensation filter 71 to the determined values. As a result, the vehicle velocity V becomes the larger, the set upper limit value Ro becomes the smaller; therefore the filter constant a1 becomes large and the filter constant a2 becomes small. Accordingly, when the vehicle velocity V increases from the state shown by a solid line in FIG. 25, the frequency of the end point of the phase lead of the output signal from the torque sensor 22 decreases as shown by the broken line, and the frequency of the start point of the phase lag increases; therefore the gain of the output from the phase compensation filter 71 to the input into the torque sensor 22 increases.

Other features are similar to those of the first embodiment, and the target drive current i* of the motor 10 is determined by multiplying the basic assist current io by the basic vehicle velocity gain Gv. The electric power steering apparatus of the eighth embodiment has functions and effects different from those of the first embodiment. To be more precise, as the vehicle velocity V increases and the assist gradient R decreases, the phase margin in the open-loop characteristic of the output to input of the torque sensor 22 increases, and therefore the stability of the control system improves. Further, when the vehicle velocity V increases, the set upper limit value Ro of the assist gradient R decreases, and the detected steering torque T corresponding to the basic assist torque To increases relatively to the torque input into the torque sensor 22; therefore the responsiveness to the steering operation improves. Thus, both the stability of the control system and the responsiveness to the steering operation can be improved.

The present invention is not limited to the above-described embodiments. For example, the mechanism that transmits the rotation of the steering wheel to the wheels so that the steering angle varies is not limited to that in the embodiments, and the rotation of the steering wheel can be transmitted from the steering shaft to the wheels via a link mechanism instead of the rack and pinion mechanism. Furthermore, the mechanism for transmitting the output of the motor for generating steering assist power to the steering system is not limited to that in the embodiments, provided that the steering assist power is provided, for example, the steering assist power can be provided by driving a ball nut engaged with a ball screw integrated with the rack by the output of the motor. Furthermore, instead of determining the basic vehicle velocity gain Gv in the calculation part 42, it can be adopted that a correspondence relationship between the steering torque T and the basic assist current io is stored, for example, as a table for each of a plurality of predetermined vehicle velocities in the calculation part 41, and the correspondence relationship between the steering torque T and the basic assist current io is determined by utilizing the interpolation calculation when the detected vehicle velocity V stands between the predetermined vehicle velocities.

The invention claimed is:

1. An electric power steering apparatus comprising:
a motor for generating steering assist power;
a torque sensor for detecting a steering torque of a steering wheel;
a vehicle velocity sensor for detecting vehicle velocity;
a controller comprising a computer, the controller being in at least indirect connection with the motor, torque sensor, and vehicle velocity sensor;
wherein the controller performs operations comprising:
storing a correspondence relationship between a detected steering torque detected by the torque sensor and a basic assist torque, whereby the relationship between the detected steering torque and the basic assist torque defines an assist gradient as a quotient of a rate of change of the basic assist torque to a rate of change of the detected steering torque;
controlling steering assist power generated by the motor based on a basic assist current according to the basic assist torque corresponding to the detected steering torque and a vehicle velocity detected by the vehicle velocity sensor;
determining the assist gradient corresponding to the detected steering torque;
determining a change acceleration corresponding value that corresponds to an acceleration of change of the steering torque by second order time differential of the detected steering torque;
storing a correspondence relationship between the change acceleration corresponding value and a correction basic current that is in direct correlation with the change acceleration corresponding value;
calculating the correction basic current corresponding to the determined change acceleration corresponding value;
storing a correspondence relationship between the assist gradient and an assist gradient gain such that the assist gradient gain decreases as the assist gradient increases;
calculating the assist gradient gain corresponding to the determined assist gradient;
multiplying the calculated correction basic current and the calculated assist gradient gain to obtain a multiplication product; and
correcting the basic assist current according to the product; whereby
a correction amount of the basic assist current is varied according to the variation of the assist gradient.

2. An electric power steering apparatus comprising:
a motor for generating steering assist power;
a torque sensor for detecting a steering torque of a steering wheel;
a vehicle velocity sensor for detecting vehicle velocity;
a controller comprising a computer, the controller being in at least indirect connection with the motor, torque sensor, and vehicle velocity sensor;
wherein the controller performs operations comprising:
storing a correspondence relationship between a detected steering torque detected by the torque sensor and a basic assist torque, whereby the relationship between the detected steering torque and the basic assist torque defines an assist gradient as a quotient of a rate of change of the basic assist torque to a rate of change of the detected steering torque;
controlling steering assist power generated by the motor based on a basic assist current according to the basic assist torque corresponding to the detected steering torque and a vehicle velocity detected by the vehicle velocity sensor;
determining the assist gradient corresponding to the detected steering torque;
determining a change rate corresponding value that corresponds to a rate of change of the steering torque by time differential of the detected steering torque;
storing a correspondence relationship between the change rate corresponding value and a correction basic current that is in direct correlation with the change rate corresponding value;
calculating the correction basic current corresponding to the determined change rate corresponding value;
storing a correspondence relationship between the assist gradient and an assist gradient gain such that the assist gradient gain is in direct or inverse correlation with the assist gradient;
calculating the assist gradient gain corresponding to the determined assist gradient;
multiplying the calculated correction basic current and the calculated assist gradient gain to obtain a multiplication product; and
correcting the basic assist current according to the product; whereby
a correction amount of the basic assist current is varied according to the variation of the assist gradient; wherein
the assist gradient gain is set to a value more than zero when the assist gradient is equal to or less than a set value.

3. An electric power steering apparatus comprising:
a motor for generating steering assist power;
a torque sensor for detecting steering torque of a steering wheel;
a vehicle velocity sensor for detecting vehicle velocity;
a low-pass filter for removing a high-frequency component from an output signal of the torque sensor;

a controller comprising a computer, the controller being in at least indirect connection with the motor, torque sensor, and vehicle velocity sensor;

wherein the controller performs operations comprising:

storing a correspondence relationship between a detected steering torque detected by the torque sensor and a basic assist torque, whereby the relationship between the detected steering torque and the basic assist torque defines an assist gradient as a quotient of a rate of change of the basic assist torque to a rate of change of the detected steering torque;

controlling steering assist power generated by the motor based on a basic assist current according to the basic assist torque corresponding to the detected steering torque and a vehicle velocity detected by the vehicle velocity sensor;

determining the assist gradient corresponding to the detected steering torque;

providing assist gradient response phase lead compensation to advance the phase of the output signal of the torque sensor that passes through the low-pass filter according to a decrease of the determined assist gradient;

determining a rotation angular velocity corresponding value that corresponds to an angular velocity of rotation of the steering wheel or the motor;

storing a correspondence relationship between the rotation angular velocity corresponding value and a correction basic current that is in inverse correlation with the rotation angular velocity corresponding value; and correcting the basic assist current according to the correction basic current corresponding to the determined rotation angular velocity corresponding value; whereby a correction amount of the basic assist current is varied according to the variation of the assist gradient.

4. An electric power steering apparatus comprising:

a motor for generating steering assist power;

a torque sensor for detecting steering torque of a steering wheel;

a vehicle velocity sensor for detecting vehicle velocity;

a low-pass filter for removing a high-frequency component from an output signal of the torque sensor;

a controller comprising a computer, the controller being in at least indirect connection with the motor, torque sensor, and vehicle velocity sensor;

wherein the controller performs operations comprising:

storing a correspondence relationship between a detected steering torque detected by the torque sensor and a basic assist torque, whereby the relationship between the detected steering torque and the basic assist torque defines an assist gradient as a quotient of a rate of change of the basic assist torque to a rate of change of the detected steering torque;

controlling steering assist power generated by the motor based on a basic assist current according to the basic assist torque corresponding to the detected steering torque and a vehicle velocity detected by the vehicle velocity sensor;

determining the assist gradient corresponding to the detected steering torque;

providing assist gradient response phase lag compensation for delaying phase of the output signal of the torque sensor that passes through the low-pass filter according to an increase of the determined assist gradient;

determining a rotation angular velocity corresponding value that corresponds to an angular velocity of rotation of the steering wheel or the motor;

storing a correspondence relationship between the rotation angular velocity corresponding value and a correction basic current that is in inverse correlation with the rotation angular velocity corresponding value; and correcting the basic assist current according to the correction basic current corresponding to the determined rotation angular velocity corresponding value; whereby a correction amount of the basic assist current is varied according to the variation of the assist gradient.

5. An electric power steering apparatus comprising:

a motor for generating steering assist power;

a torque sensor for detecting steering torque of a steering wheel;

a low-pass filter for removing a high-frequency component from an output signal of the torque sensor;

a vehicle velocity sensor for detecting the vehicle velocity;

a controller comprising a computer, the controller being in at least indirect connection with the motor, torque sensor, and vehicle velocity sensor, wherein the controller performs operations comprising:

storing a correspondence relationship between a detected steering torque detected by the torque sensor and a basic assist torque, whereby the relationship between the detected steering torque and the basic assist torque defines an assist gradient as a quotient of a rate of change of the basic assist torque to a rate of change of the detected steering torque;

controlling steering assist power generated by the motor based on a basic assist current according to the basic assist torque corresponding to the detected steering torque and a vehicle velocity detected by the vehicle velocity sensor;

setting an upper limit value for the assist gradient that varies according to variation of the steering torque;

setting the correspondence relationship between the steering torque and the basic assist torque, whereby the set upper limit value of the assist gradient varies according to variation of vehicle velocity;

determining the set upper limit value of the assist gradient at the detected vehicle velocity;

providing assist gradient response phase compensation for performing phase lead-lag compensation for the output signal of the torque sensor that passes through the low-pass filter in such a manner that a frequency of an end point of the phase lead and a frequency of a start point of the phase lag vary according to the set upper limit value of the assist gradient at the detected vehicle velocity;

whereby, in the phase lead-lag compensation, the frequency of the end point of the phase lead decreases and the frequency of the start point of the phase lag increases according to increase of the vehicle velocity; and a correction amount of the basic assist current is varied according to the variation of the assist gradient.

* * * * *